US012175700B2

(12) United States Patent
Ego et al.

(10) Patent No.: US 12,175,700 B2
(45) Date of Patent: Dec. 24, 2024

(54) INFORMATION PROCESSING APPARATUS, INFORMATION PROCESSING METHOD, GUIDE SYSTEM, AND GUIDE METHOD

(71) Applicant: FUJIFILM Corporation, Tokyo (JP)

(72) Inventors: Shunta Ego, Saitama (JP); Masahiro Terada, Saitama (JP); Daisuke Hayashi, Saitama (JP); Kenji Makino, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 122 days.

(21) Appl. No.: 17/748,009

(22) Filed: May 18, 2022

(65) Prior Publication Data
US 2022/0277471 A1 Sep. 1, 2022

Related U.S. Application Data

(63) Continuation of application No. PCT/JP2020/042896, filed on Nov. 18, 2020.

(30) Foreign Application Priority Data

Nov. 26, 2019 (JP) .................................. 2019-213252

(51) Int. Cl.
G06T 7/70 (2017.01)
G06T 7/11 (2017.01)
(Continued)

(52) U.S. Cl.
CPC .................. *G06T 7/70* (2017.01); *G06T 7/11* (2017.01); *G06T 7/20* (2013.01); *G06V 10/22* (2022.01);
(Continued)

(58) Field of Classification Search
CPC ..... G06T 7/70; G06T 7/11; G06T 7/20; G06T 2207/10016; G06T 2207/20021;
(Continued)

(56) References Cited

U.S. PATENT DOCUMENTS 10,473,471 B2 * 11/2019 Imoto ................ G06Q 10/0635
2015/0297949 A1 * 10/2015 Aman ..................... G06T 7/246
348/157
(Continued)

FOREIGN PATENT DOCUMENTS

JP 2003345999 12/2003
JP 2017142681 8/2017
(Continued)

OTHER PUBLICATIONS

"International Search Report (Form PCT/ISA/210) of PCT/JP2020/042896," mailed on Jan. 26, 2021, with English translation thereof, pp. 1-5.
(Continued)

*Primary Examiner* — Daniel T Tekle
(74) *Attorney, Agent, or Firm* — JCIPRNET

(57) ABSTRACT

There are provided an information processing apparatus, an information processing method, a guide system, and a guide method that can set optimum movement routes depending on a situation. The guide method includes: a step of taking an image; a step of detecting persons from the taken image; a step of digitizing and estimating states of the detected persons; a step of creating map data in which the states of the persons are shown on a map according to positions of the persons in the taken image; a first area estimation step that estimates a first area on the basis of the map data; a step of setting movement routes for persons of the first area and/or persons of a second area other than the first area; a step of transmitting information about the set movement routes; and a step of receiving the transmitted information about the movement routes and presenting the received information about the movement routes and/or guidance information about routes based on the information about the movement routes.

21 Claims, 24 Drawing Sheets

(51) Int. Cl.
  *G06T 7/20*    (2017.01)
  *G06V 10/22*   (2022.01)
  *G06V 20/50*   (2022.01)
  *G06V 40/16*   (2022.01)
  *G06V 40/20*   (2022.01)
  *H04N 7/18*    (2006.01)

(52) U.S. Cl.
  CPC ............ *G06V 20/50* (2022.01); *G06V 40/174* (2022.01); *G06V 40/20* (2022.01); *H04N 7/183* (2013.01); *G06T 2207/10016* (2013.01); *G06T 2207/20021* (2013.01); *G06T 2207/30201* (2013.01); *G06T 2207/30242* (2013.01)

(58) Field of Classification Search
  CPC ........... G06T 2207/30201; G06T 2207/30242; G06V 40/174; G06V 10/22; G06V 20/50; G06V 40/20; H04N 7/183
  See application file for complete search history.

(56) References Cited

U.S. PATENT DOCUMENTS

| | | | |
|---|---|---|---|
| 2018/0089785 A1* | 3/2018 | Imoto | G08B 27/005 |
| 2018/0286068 A1* | 10/2018 | Matsubara | G06T 7/60 |
| 2019/0026560 A1* | 1/2019 | Nishikawa | G06T 7/246 |
| 2019/0034700 A1* | 1/2019 | Xie | G06T 7/246 |
| 2022/0277471 A1 | 9/2022 | Ego et al. | |

FOREIGN PATENT DOCUMENTS

| | | |
|---|---|---|
| WO | 2016157279 | 10/2016 |
| WO | 2021106696 | 6/2021 |

OTHER PUBLICATIONS

"Written Opinion of the International Searching Authority (Form PCT/ISA/237) of PCT/ JP2020/042896," mailed on Jan. 26, 2021, with English translation thereof, pp. 1-6.

"Office Action of Japan Counterpart Application", issued on Sep. 12, 2024, with English translation thereof, pp. 1-11.

* cited by examiner

FIG. 9

| EXPRESSION | | ORIENTATION OF FACE | | MOVEMENT OF BODY | |
|---|---|---|---|---|---|
| JOY | 4 | FRONT SIDE | 5 | STANDING UP | 3 |
| ANGER | 5 | UPPER SIDE | 2 | SEATED | 1 |
| DISGUST | 2 | LOWER SIDE | 1 | JUMPING UP | 5 |
| SURPRISAL | 3 | LATERAL SIDE | 2 | RAISING HANDS | 4 |
| FEAR | 2 | DIAGONALLY UPPER SIDE | 2 | CLAPPING HANDS | 3 |
| SADNESS | 1 | DIAGONALLY LOWER SIDE | 1 | ... | ... |
| SOBER FACE | 1 | | | | |

FIG. 11

| LEVEL OF EXCITEMENT | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| DOT | ○ | ○ | ○ | ○ | ○ | ○ | ● | ● | ● | ● | ● | ● | ● | ● | ● |

INFORMATION PROCESSING APPARATUS, INFORMATION PROCESSING METHOD, GUIDE SYSTEM, AND GUIDE METHOD

CROSS-REFERENCE TO RELATED APPLICATIONS

The present application is a Continuation of PCT International Application No. PCT/JP2020/042896 filed on Nov. 18, 2020 claiming priority under 35 U.S.C § 119(a) to Japanese Patent Application No. 2019-213252 filed on Nov. 26, 2019. Each of the above applications is hereby expressly incorporated by reference, in its entirety, into the present application.

BACKGROUND OF THE INVENTION

1. Field of the Invention

The present invention relates to an information processing apparatus, an information processing method, a guide system, and a guide method.

2. Description of the Related Art

JP2003-345999A discloses a system that provides information about an optimum evacuation route to a spectator of each seat in a case where a disaster occurs in an event venue. Since an evacuation route from each seat is obtained in advance in JP2003-345999A, an optimum evacuation route can be provided to a spectator of each seat.

SUMMARY OF THE INVENTION

An embodiment according to a technique of the present disclosure provides an information processing apparatus, an information processing method, a guide system, and a guide method that can set movement routes depending on a situation.

(1) An information processing apparatus comprises a person detection unit that detects persons from an input image, an estimation unit that digitizes and estimates states of the persons detected by the person detection unit, a map data creation unit that creates map data in which the states of the persons are shown on a map according to positions of the persons in the input image, a first area estimation unit that estimates a first area on the basis of the map data, and a movement route setting unit that sets movement routes for persons of the first area and/or persons of a second area other than the first area.

(2) The information processing apparatus according to (1) further comprises a transmission unit that transmits information about the movement routes set by the movement route setting unit.

(3) In the information processing apparatus according to (1) or (2), the estimation unit comprises a recognizing section that recognizes at least one of an expression of a face or movement of a body of each of the persons from an image of each of the persons detected by the person detection unit, and digitizes and estimates the state of each of the persons on the basis of recognition results of the recognizing section.

(4) In the information processing apparatus according to (3), the estimation unit gives scores to the recognition results of the recognizing section according to predetermined criteria and digitizes the state of each of the persons.

(5) In the information processing apparatus according to (3) or (4), the recognizing section recognizes the expression of the face, an orientation of the face, and the movement of the body of each of the persons from the image of each of the persons detected by the person detection unit, and the estimation unit gives scores to the recognition results of the expression of the face, the orientation of the face, and the movement of the body of each of the persons, which are obtained from the recognizing section, according to predetermined criteria and obtains a sum of the scores to digitize the state of each of the persons.

(6) In the information processing apparatus according to any one of (1) to (5), the first area estimation unit comprises a counting section that divides the input image into a plurality of partial areas and counts the persons having a state equal to or higher than a first threshold value in each partial area and an extracting section that extracts the partial area in which the number of the persons having a state equal to or higher than the first threshold value is equal to or larger than a second threshold value. The first area estimation unit estimates the partial area, which is extracted by the extracting section, as the first area.

(7) The information processing apparatus according to any one of (1) to (6) further comprises: a recording unit that records the states of the persons, which are estimated by the estimation unit, over time; and a maximum value detection unit that detects maximum values of the states of the persons recorded over time in the recording unit. The map data creation unit creates the map data using the maximum values.

(8) In the information processing apparatus according to any one of (1) to (7), the input image is an image that is obtained from imaging of a venue including a seat area in which a plurality of seats are arranged, and the first area and the second area are set in the seat area.

(9) The information processing apparatus according to any one of (1) to (8) further comprises an output unit that outputs data obtained from visualization of the map data and/or information about the movement routes.

(10) The information processing apparatus according to any one of (1) to (9) further comprises a display unit that displays data obtained from visualization of the map data and/or information about the movement routes.

(11) A guide system comprises the information processing apparatus according to (2), an imaging device that takes an image to be input to the information processing apparatus, and a presentation device that receives the information about the movement routes transmitted from the information processing apparatus and presents the received information about the movement routes and/or guidance information about routes based on the information about the movement routes.

(12) An information processing method comprises a step of detecting persons from an input image, a step of digitizing and estimating states of the detected persons, a step of creating map data in which the states of the persons are shown on a map according to positions of the persons in the input image, a first area estimation step that estimates a first area on the basis of the map data, and a step of setting movement routes for persons of the first area and/or persons of a second area other than the first area.

(13) The information processing method according to (12) further comprises a step of transmitting information about the set movement routes.

(14) A guide method comprises a step of taking an image, a step of detecting persons from the taken image, a step of digitizing and estimating states of the detected persons, a step of creating map data in which the states of the persons are shown on a map according to positions of the persons in the taken image, a first area estimation step that estimates a first area on the basis of the map data, a step of setting movement routes for persons of the first area and/or persons of a second area other than the first area, a step of transmitting information about the set movement routes, and a step of receiving the transmitted information about the movement routes and presenting the received information about the movement routes and/or guidance information about routes based on the information about the movement routes.

BRIEF DESCRIPTION OF THE DRAWINGS

FIG. 9 is a diagram showing an example of determination criteria.

FIG. 11 is a diagram showing a relationship between the level of excitement and the display density of dots.

DESCRIPTION OF THE PREFERRED EMBODIMENTS

Preferred embodiments of the present invention will be described in detail below with reference to the accompanying drawings.

First Embodiment

In a case where spectators are to be guided in an event venue, it is common to select the shortest route to a destination to guide the spectators. However, it is not always appropriate to guide all spectators uniformly along the shortest route. For example, in a case where there is a group of excited spectators in a venue, there is a concern that, in a case where other spectators are guided along the same route as these spectators, the other spectators may be involved in unexpected trouble. In this embodiment, there is provided a guide system that can set movement routes for persons, such as spectators, depending on a situation.

[Configuration of Guide System]

Here, a case where spectators present in an event venue including seats (spectators' seats) are guided in the event venue will be described by way of example.

Figure 1:
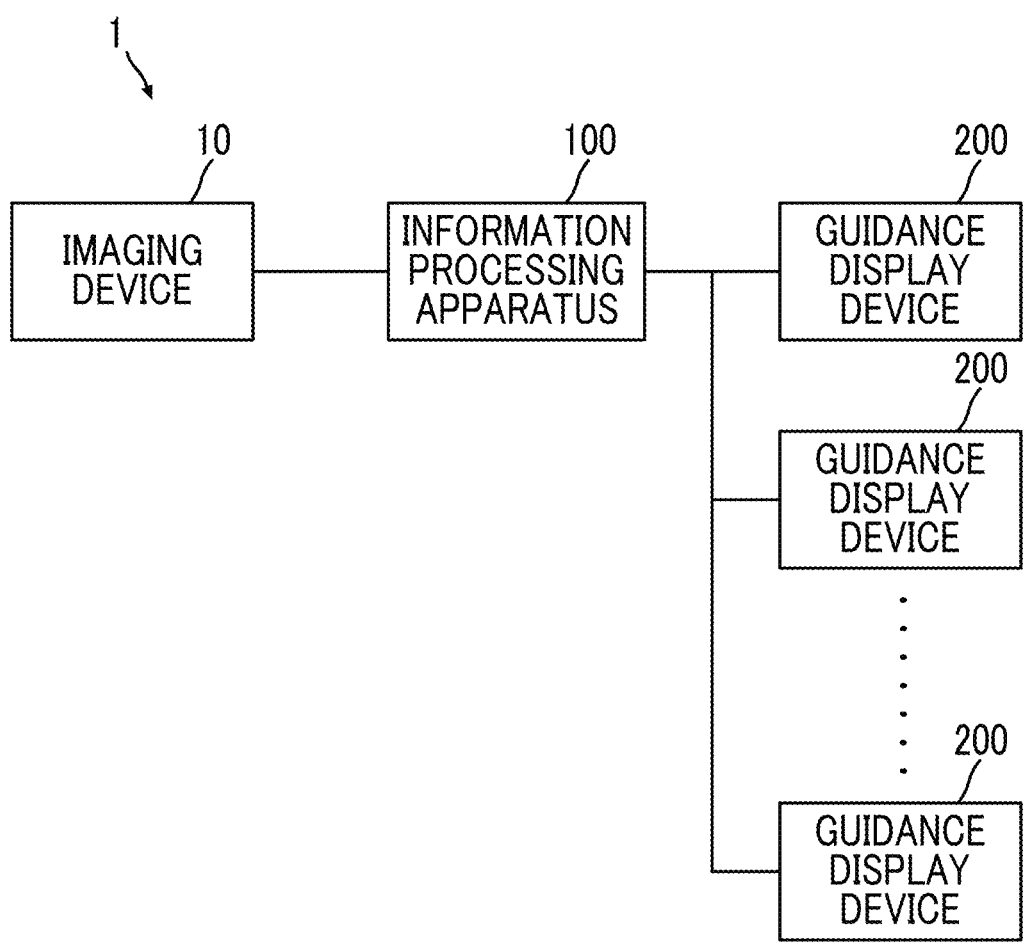
FIG. 1 is a diagram showing the schematic configuration of a guide system.

FIG. 1 is a diagram showing the schematic configuration of the guide system according to this embodiment.

As shown in FIG. 1, a guide system 1 according to this embodiment comprises an imaging device 10 that images the inside of the venue, an information processing apparatus 100 that processes images taken by the imaging device 10 to set movement routes for spectators present in the venue, and guidance display devices 200 that display guidance information about the routes on the basis of information about the movement routes set by the information processing apparatus 100.

[Imaging Device]

The imaging device 10 images an area in which spectators are present (hereinafter, referred to as a spectator area) in the event venue. In the event venue including seats (spectators' seats), an area (seat area) in which the seats are arranged correspond to a spectator area. Accordingly, the seat area is imaged as a spectator area in the event venue including seats.

The imaging device 10 is formed of a camera (a so-called digital camera including a digital video camera) that records images as digital data. In a case where the entire spectator area in the venue cannot be imaged by one camera, the imaging device 10 is formed of a combination of a plurality of cameras. In this case, the spectator area is divided into a plurality of areas and the respective areas are assigned and imaged. A case where the entire spectator area cannot be imaged by one camera means a case where the state of each spectator present in the spectator area cannot be determined from the taken images, particularly, a case where the expression of a face cannot be determined. Accordingly, a case where the state of each spectator cannot be determined from the taken images even though the entire spectator area is within the angle of view corresponds to a case where the entire spectator area cannot be imaged by one camera.

Figure 2:
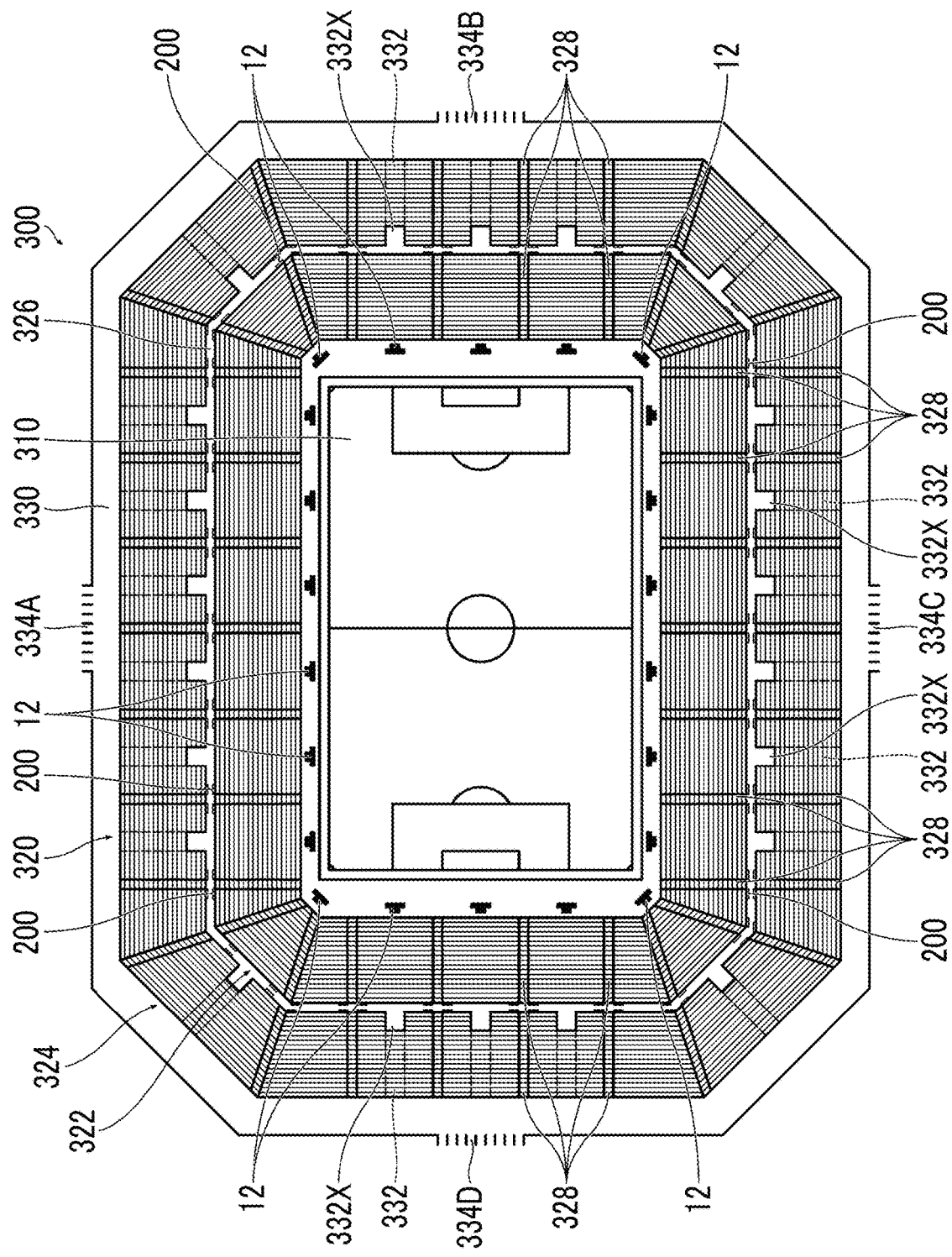
FIG. 2 is a diagram showing an example of an event venue.

FIG. 2 is a diagram showing an example of the event venue. FIG. 2 is a plan view of the event venue.

The event venue 300 shown in FIG. 2 is a so-called stadium. The event venue 300 includes a ground 310 on which players play a match and a spectator area 320 in which spectators watch a match. The ground 310 has a rectangular shape, and the spectator area 320 is provided to surround the ground 310. The spectator area 320 has a mortar-shaped structure (a shape recessed in a pyramid shape), and the seats (spectators' seats) are arranged in a stepwise manner. Further, the spectator area 320 has a two-story structure, and includes a first-floor seating area 322 and a second-floor seating area 324. A passage 326, which has an annular shape, (hereinafter, referred to as an annular passage 326) forming a landing is provided between the first-floor seating area 322 and the second-floor seating area 324. Each of the first-floor seating area 322 and the second-floor seating area 324 is divided into a plurality of blocks in a circumferential direction. The seats are arranged in each block of the first-floor seating area 322 and the second-floor seating area 324. The seats are regularly arranged in each block. A passage 328 (hereinafter, referred to as an inter-block passage 328) is provided between the respective blocks. The inter-blocks passage 328 are connected to the annular passage 326. Handrails 328A are provided in the middle portion of the inter-block passage 328 in a width direction (see FIG. 4). The handrails 328A divide the inter-block passage 328 into left and right portions. The handrails 328A are arranged at regular intervals along the inter-block passage 328. Doorways 332X of passages 332 (hereinafter, referred to as connecting passages 332) connected to an outer peripheral area 330 are provided at a plurality of positions in the annular passage 326.

Figure 3:
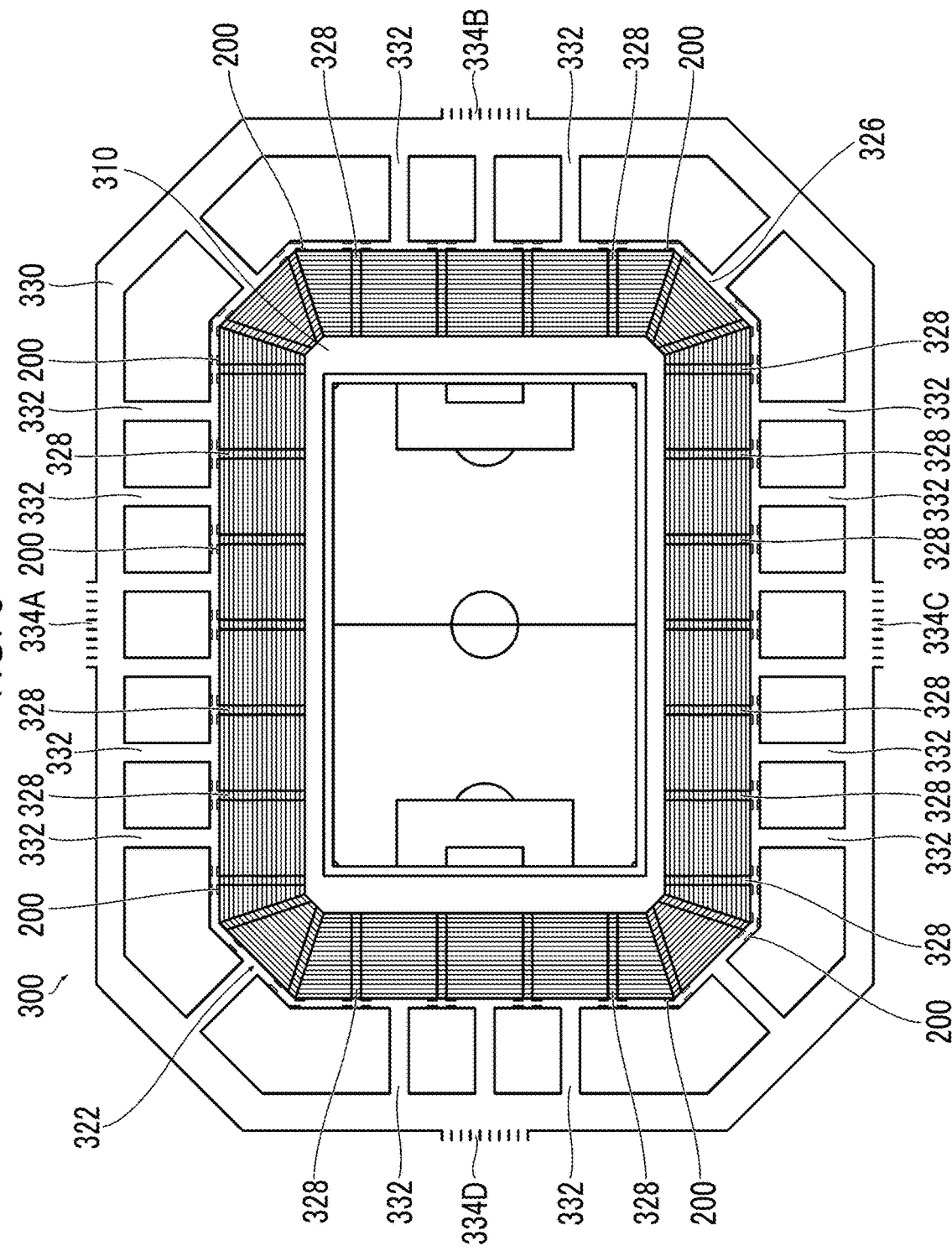
FIG. 3 is a diagram showing the arrangement of connecting passages.

FIG. 3 is a diagram showing the arrangement of the connecting passages.

The outer peripheral area 330 is provided on the outer periphery of the spectator area 320 as an annular area. The outer peripheral area 330 is provided with gates 334A to 334D at four positions around the outer peripheral area 330. Each spectator enters the event venue 300 using any one of the gates 334A to 334D. The spectator having entered the event venue 300 enters the spectator area 320 from the outer peripheral area 330 through any one of connecting passages 332. Further, in the spectator area 320, each spectator arrives at one's seat through the annular passage 326 and the inter-block passage 328.

Figure 4:
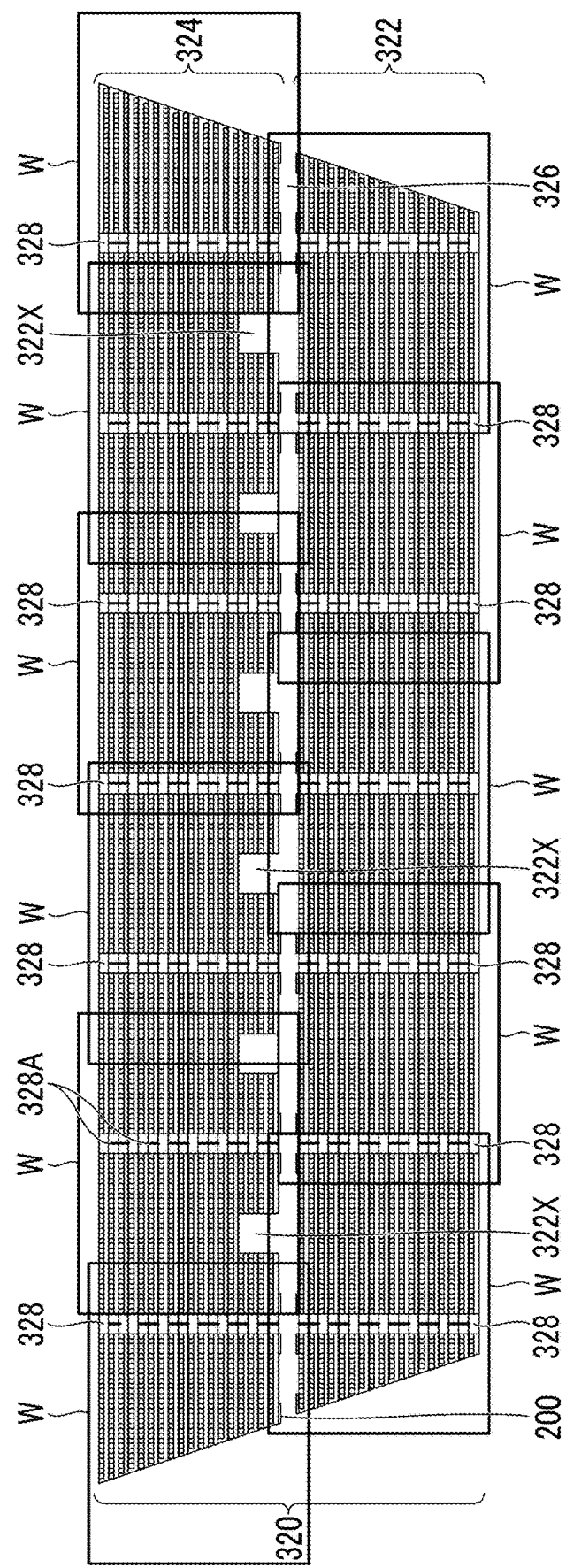
FIG. 4 is a diagram showing an example of the setting of the imaging ranges of cameras.

As shown in FIG. 2, the imaging device 10 of this embodiment is formed of a combination of a plurality of cameras 12. Each camera 12 images a region to be imaged at a fixed position. FIG. 4 is a diagram showing an example of the setting of the imaging ranges of the respective cameras. As shown in FIG. 4, imaging ranges W of the cameras for imaging adjacent regions are set to partially overlap with each other. Accordingly, the spectator area 320 can be imaged without omission.

Each camera 12 is installed at a position where the face of a spectator present in an area to be imaged can be imaged. Further, each camera 12 is configured to have performance that allows the expression of the spectator to be recognized from the taken images. That is, each camera 12 has resolution performance that is required and sufficient to recognize the expression of a spectator from the taken images.

The imaging device 10 composites images taken by the respective cameras 12 and outputs (including "transmit") a composite image to the information processing apparatus 100. That is, the imaging device 10 generates one image of the entire spectator area 320 and outputs this image to the information processing apparatus 100. In a case where the imaging device 10 performs composition processing for compositing images and outputs a composite image as described above, the imaging device 10 is provided with a composition processing unit. In this case, the imaging device 10 comprises a plurality of imaging units (cameras) and a composition processing unit that performs composition processing for compositing images taken by the respective imaging units. The composition processing can be configured to be performed by another device separate from the imaging device 10. For example, the composition processing can also be configured to be performed by the information processing apparatus 100.

[Information Processing Apparatus]

The information processing apparatus 100 processes the image taken by the imaging device 10 to set movement routes for spectators present in the venue, and transmits the set movement routes to the guidance display devices 200.

Figure 5:
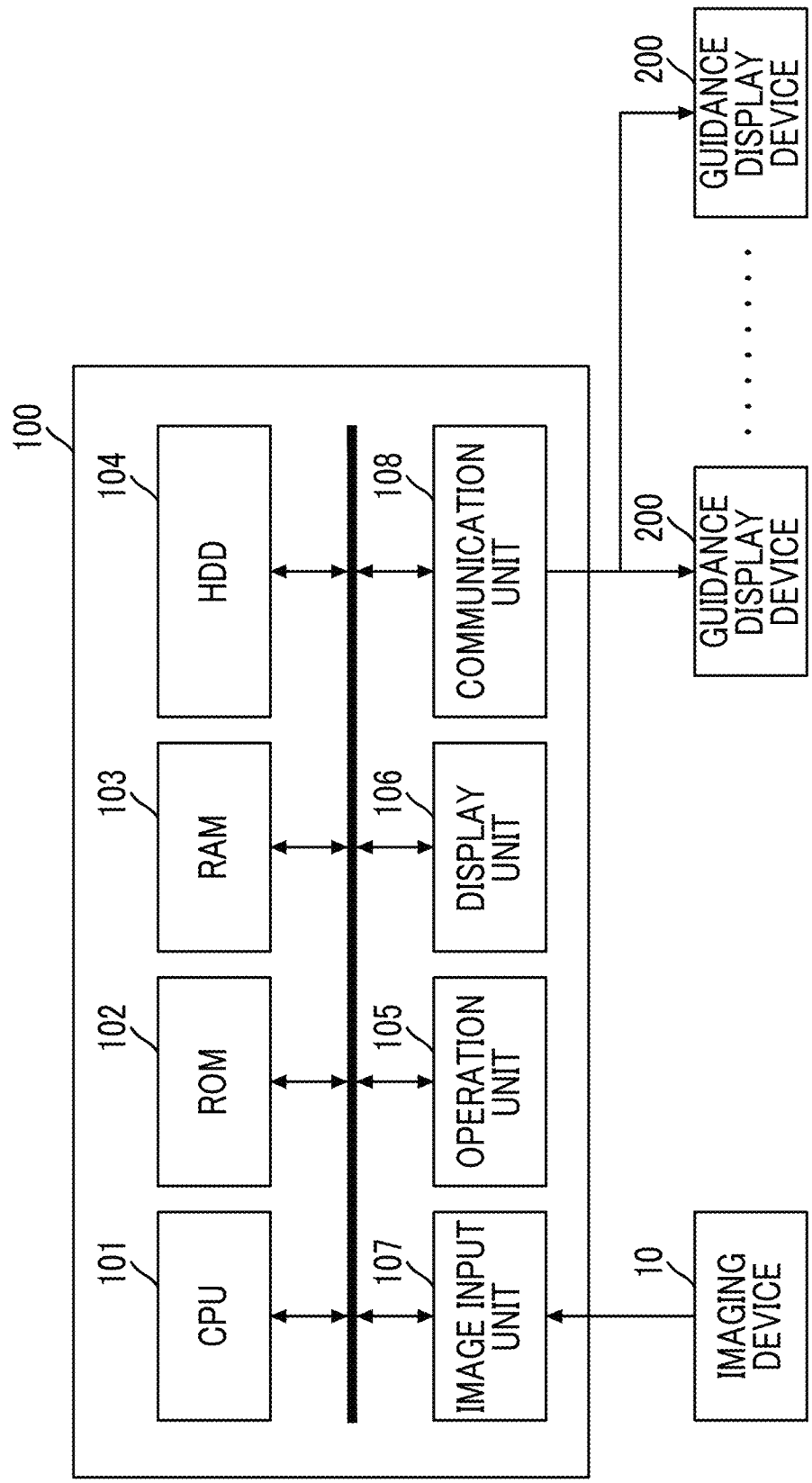
FIG. 5 is a block diagram showing an example of the hardware configuration of an information processing apparatus.

FIG. 5 is a block diagram showing an example of the hardware configuration of the information processing apparatus.

The information processing apparatus 100 is formed of a computer that comprises a central processing unit (CPU) 101, a read only memory (ROM) 102, a random access memory (RAM) 103, a hard disk drive (HDD) 104, an operation unit (for example, a keyboard, a mouse, a touch panel, and the like) 105, a display unit (for example, a liquid crystal display (LCD), an organic electro-luminescence display (OELD), or the like) 106, an image input unit 107, a communication unit 108, and the like. The images taken by the imaging device 10 are input (including "receive") to the information processing apparatus 100 through the image input unit 107. Information about the movement routes set by the information processing apparatus 100 is transmitted to the guidance display devices 200 through the communication unit 108.

Figure 6:
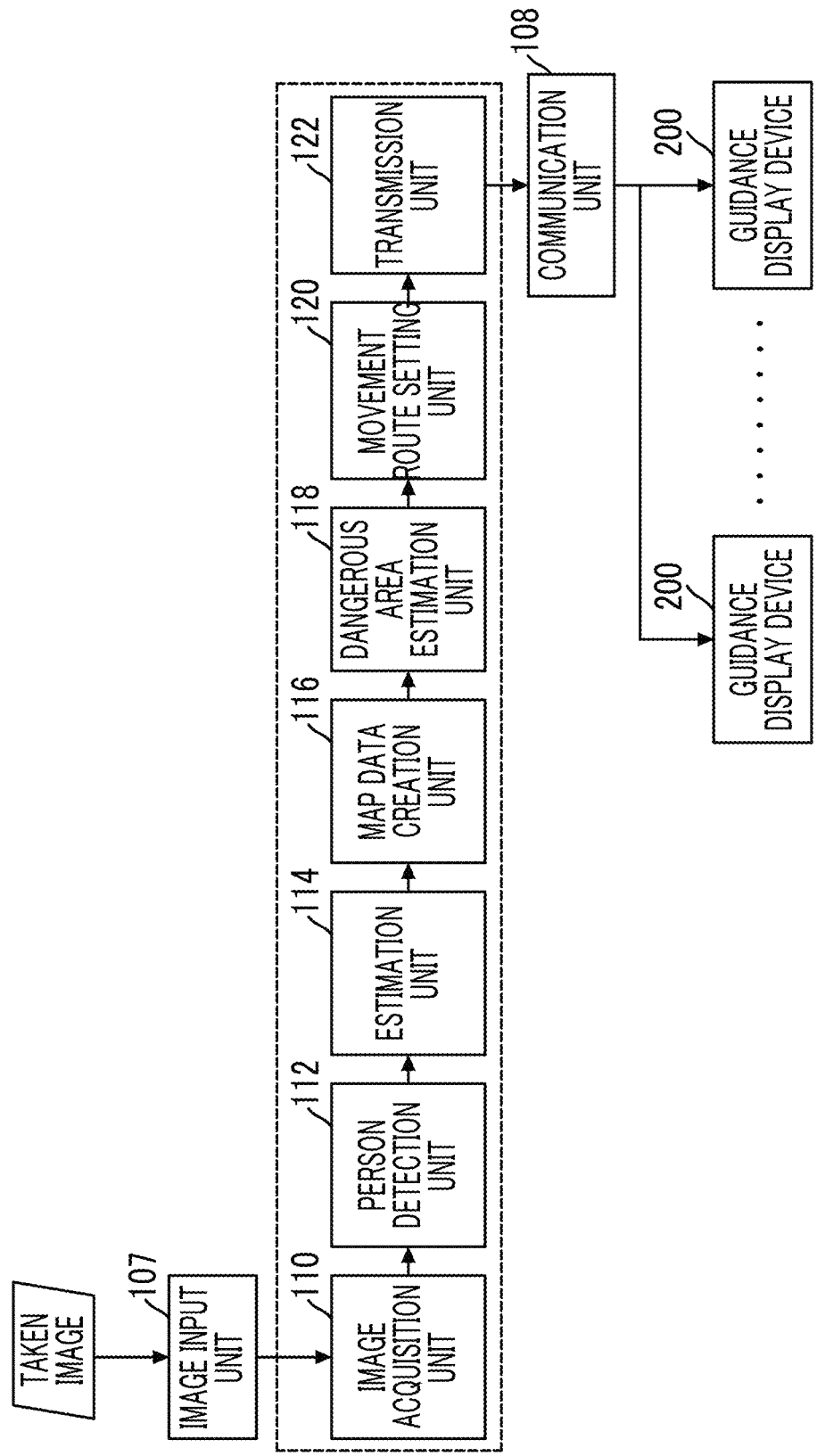
FIG. 6 is a block diagram showing functions that are realized by the information processing apparatus.

FIG. 6 is a block diagram showing functions that are realized by the information processing apparatus.

As shown in FIG. 6, the information processing apparatus 100 realizes the functions of an image acquisition unit 110 that acquires the image taken by the imaging device 10, a person detection unit 112 that detects persons from the image acquired by the image acquisition unit 110, an estimation unit 114 that estimates the states of the persons detected by the person detection unit 112, a map data creation unit 116 that creates map data in which the state of each spectator present in the venue is shown on a map according to the position of each spectator on the basis of the estimation results of the estimation unit 114, a dangerous area estimation unit 118 that estimates a dangerous area present in the venue on the basis of the map data, a movement route setting unit 120 that sets movement routes for the spectators on the basis of information about the dangerous area estimated by the dangerous area estimation unit 118, and a transmission unit 122 that transmits information about the set movement routes to the guidance display devices 200. The CPU 101, which is a processor, executes a predetermined program, so that each function is realized.

The image acquisition unit 110 captures an image (taken image), which is output from the imaging device 10, into the information processing apparatus 100 through the image input unit 107. The captured image (an image taken by the imaging device 10) forms an input image.

The person detection unit 112 detects a person from the input image. Specifically, the person detection unit 112 detects the face of a person from the image to detect the person. Since this kind of technique is a publicly known technique, the description of the specific method of the technique will be omitted. For example, a method of detecting a person from an image using an image recognition model that is generated by machine learning, deep learning, or the like can be employed. The position (a position in the input image) of the person is specified, so that the person is detected. The position in the input image is specified by, for example, coordinates set with respect to the input image. In the information processing apparatus 100 according to this embodiment, the input image is an image that is obtained from the imaging of the spectator area. Accordingly, a spectator (person) present in the spectator area is detected by the person detection unit 112.

The estimation unit 114 estimates the state of the person (spectator), which is detected by the person detection unit 112, from the image of the person. In this embodiment, the estimation unit 114 estimates the degree of excitement from the image as the state of the person. The degree of excitement is digitized and estimated. A numerical value, which is obtained by the digitization of the degree of excitement, is defined as the level of excitement. In this embodiment, the level of excitement is calculated by the following method. First, respective items, such as the expression, the orientation of the face, and the movement of the body of the person, are recognized from the image of the person. Next, scores are given to the respective items recognized according to predetermined determination criteria. The determination criteria have configuration where a higher score is given to an item considered to be more excited for each item. Finally, the sum of given scores is obtained. The obtained sum of scores is the estimation result of the level of excitement of the person.

Figure 7:
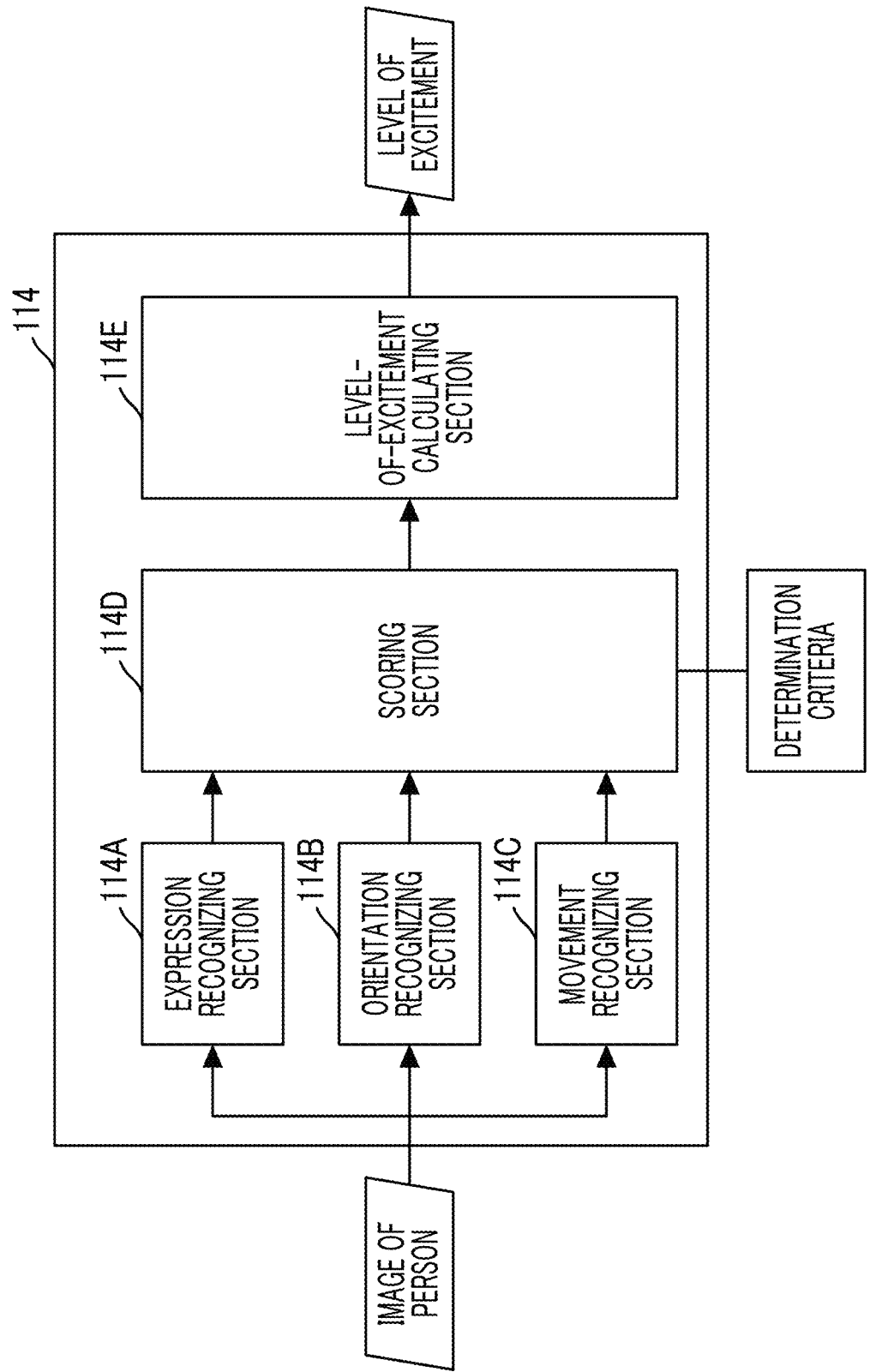
FIG. 7 is a block diagram showing the functions of an estimation unit.

FIG. 7 is a block diagram showing the functions of the estimation unit.

As shown in FIG. 7, the estimation unit 114 has the functions of an expression recognizing section 114A that recognizes the expression of the face of the person from the image of the person, an orientation recognizing section 114B that recognizes the orientation of the face from the image of the person, a movement recognizing section 114C that recognizes the movement of a body from the image of the person, a scoring section 114D that scores items recognized by the respective recognizing sections, and an level-of-excitement calculating section 114E that sums up scoring results to calculate the level of excitement.

The expression recognizing section 114A recognizes the expression of the person from the image of the person (spectator), particularly, the image of a face portion that is detected by the person detection unit 112. In this embodiment, the expression recognizing section 114A specifies plausible one from a predetermined plurality of types of expressions and recognizes a target expression. The types of expressions can be represented by words that indicate emotions. In this embodiment, the expression recognizing section 114A classifies expressions into seven types, that is, "joy", "anger", "disgust", "surprisal", "fear", "sadness", and "sober face (absence of expression)", specifies plausible one from them, and recognizes an expression. A technique for recognizing the expression of the person from the image is a publicly known technique. Even in this embodiment, a publicly known method is employed to recognize the expression of the person from the image. For example, a method of recognizing the expression of a person from an image using an image recognition model that is generated by machine learning, deep learning, or the like can be employed. As described above, the types of expressions can be represented by words that indicate emotions. Accordingly, the recognition of an expression is synonymous with the recognition of an emotion.

The orientation recognizing section 114B recognizes the orientation of the face of the person from the image of the person (spectator), particularly, the image of a face portion that is detected by the person detection unit 112. That is, the orientation recognizing section 114B recognizes a direction in which the face faces (front side, upper side, lower side, lateral side, diagonally upper side, and diagonally lower side). A publicly known technique can be employed even in this processing.

The movement recognizing section 114C recognizes the movement of the body of the person from the image of the person (spectator) that is detected by the person detection unit 112. In this embodiment, the movement recognizing section 114C recognizes whether there is a predetermined movement. For example, the movement recognizing section 114C recognizes that the person is standing up, is seated, is jumping up, is raising hands, is clapping hands, and the like. A publicly known technique can be employed even in this processing.

Figure 8:
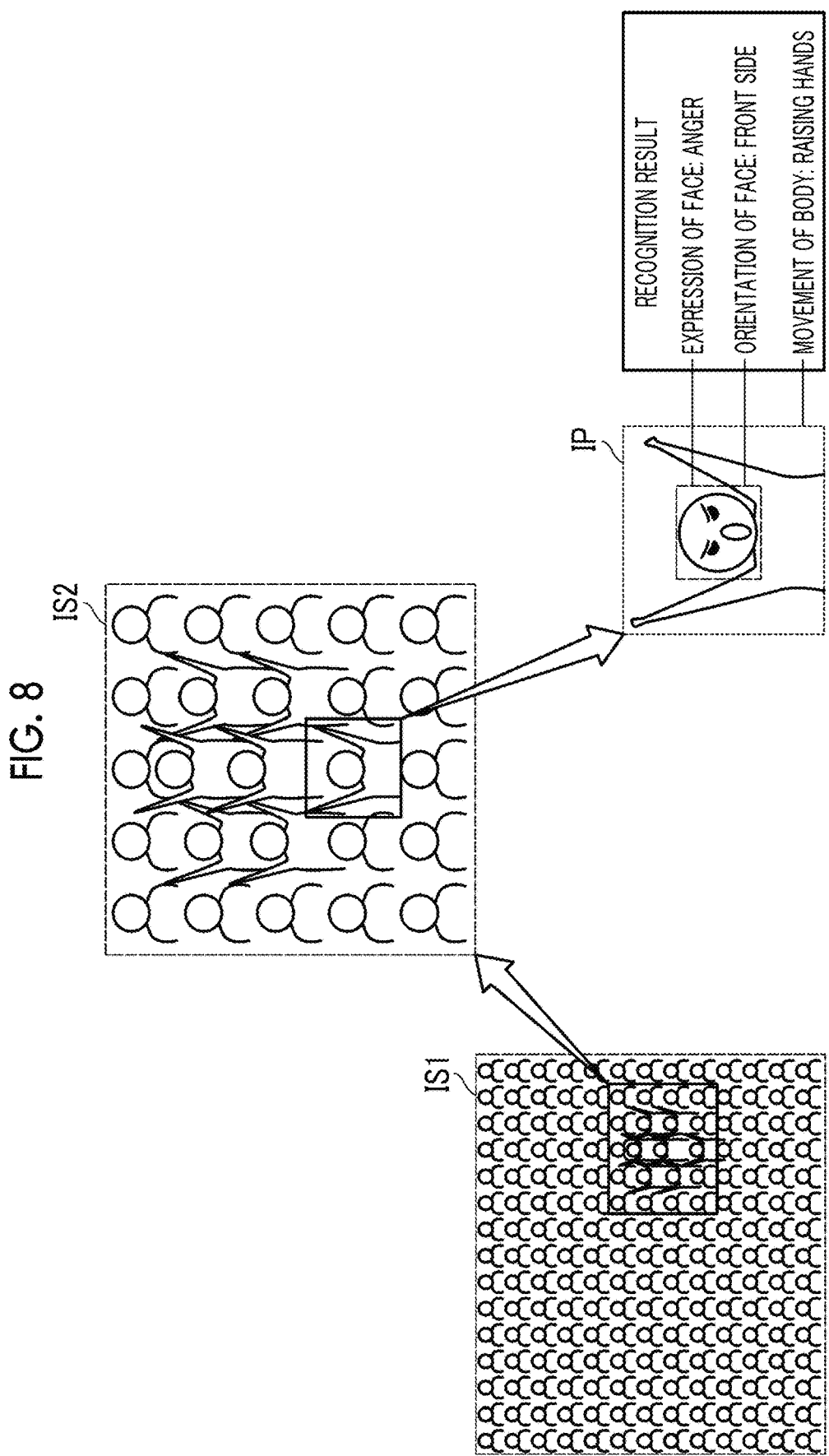
FIG. 8 is a conceptual diagram showing processing that is to be performed until an expression, the orientation of a face, and the movement of a body are recognized from the detection of a person.

FIG. 8 is a conceptual diagram showing processing that is to be performed until an expression, the orientation of the face, and the movement of a body are recognized from the detection of the person.

As shown in FIG. 8, the person (spectator) is detected from the taken image and the expression, the orientation of the face, and the movement of the body of the person are recognized from the image IP of the detected person. In FIG. 8, an image denoted by reference numeral IS1 is an image showing a part of the taken image and an image denoted by reference numeral IS2 is an enlarged image of a part (a region surrounded by a rectangular frame) of the image IS1.

The scoring section 114D gives scores to items recognized by the respective recognizing sections (the expression recognizing section 114A, the orientation recognizing section 114B, and the movement recognizing section 114C) according to the predetermined determination criteria to score the items.

FIG. 9 is a diagram showing an example of the determination criteria.

As shown in FIG. 9, scores to be given to the items recognized by the respective recognizing sections are determined. A higher score is assigned to an item that is considered to be more excited. Information about the determination criteria is stored in, for example, the ROM 103 and the HDD 104. The scoring section 114D gives scores to the items, which are recognized by the respective recognizing sections, according to the determination criteria. For example, in a case where the recognition result of "expression" of a certain person (spectator) is "anger", the recognition result of "the orientation of the face" thereof is "front side", and the recognition result of "the movement of the body" thereof is "the person is jumping up", a score to be given to the item of "expression" is 5 points (anger), a score to be given to the item of "the orientation of the face" is 5 points (front side), and a score to be given to the item of "the movement of the body" thereof is 5 points (the person is jumping up). Further, for example, in a case where the recognition result of "expression" of a certain person (spectator) is "sadness", the recognition result of "the orientation of the face" thereof is "lower side", and the recognition result of "the movement of the body" thereof is "the person is seated", a score to be given to the item of "expression" is 1 point (sadness), a score to be given to the item of "the orientation of the face" is 1 point (lower side), and a score to be given to the item of "the movement of the body" thereof is 1 point (the person is seated).

The level-of-excitement calculating section 114E sums up the scores, which are given by the scoring section 114D, to calculate the level of excitement. For example, in a case where 5 points are given to the item of "expression" of a certain person (spectator), 5 points are given to the item of "the orientation of the face" thereof, and 5 points are given to the item of "the movement of the body" thereof, the level of excitement of the person is calculated as 15 (=5+5+5).

The level of excitement calculated by the level-of-excitement calculating section 114E is added to the map data creation unit 116 as the estimation result of the state of the person. Information about the level of excitement of each spectator is associated with information about the position of each spectator and is added to the map data creation unit 116.

The map data creation unit 116 creates map data in which the level of excitement of each spectator (the state of each spectator) present in the venue is shown on a map according to the position of each spectator on the basis of the estimation results of the estimation unit 114. The map is the map of the event venue. As described above, the level of excitement of each spectator is obtained in a state where the position of each spectator in the taken image is specified. The map data creation unit 116 converts the position of each spectator in the taken image into the position of each spectator on the map to specify the position of each spectator on the map. The position is converted using, for example, a conversion equation or the like. A relationship between the taken image and the map is obtained in advance to generate the conversion equation or the like. The generated conversion equation or the like is stored in the HDD 104. The position on the map is specified by, for example, coordinates set on the map. In this case, the coordinate position of each spectator in the taken image is converted into a coordinate position on the map.

With regard to the map data, the level of excitement of each spectator is expressed by a color or light and shade, so that the level of excitement of each spectator can be visualized. That is, the level of excitement of each spectator is expressed in the image of the map by a color or light and shade according to the numerical value of the level of excitement, so that the level of excitement of each spectator can be visualized (a so-called heat map).

Figure 10:
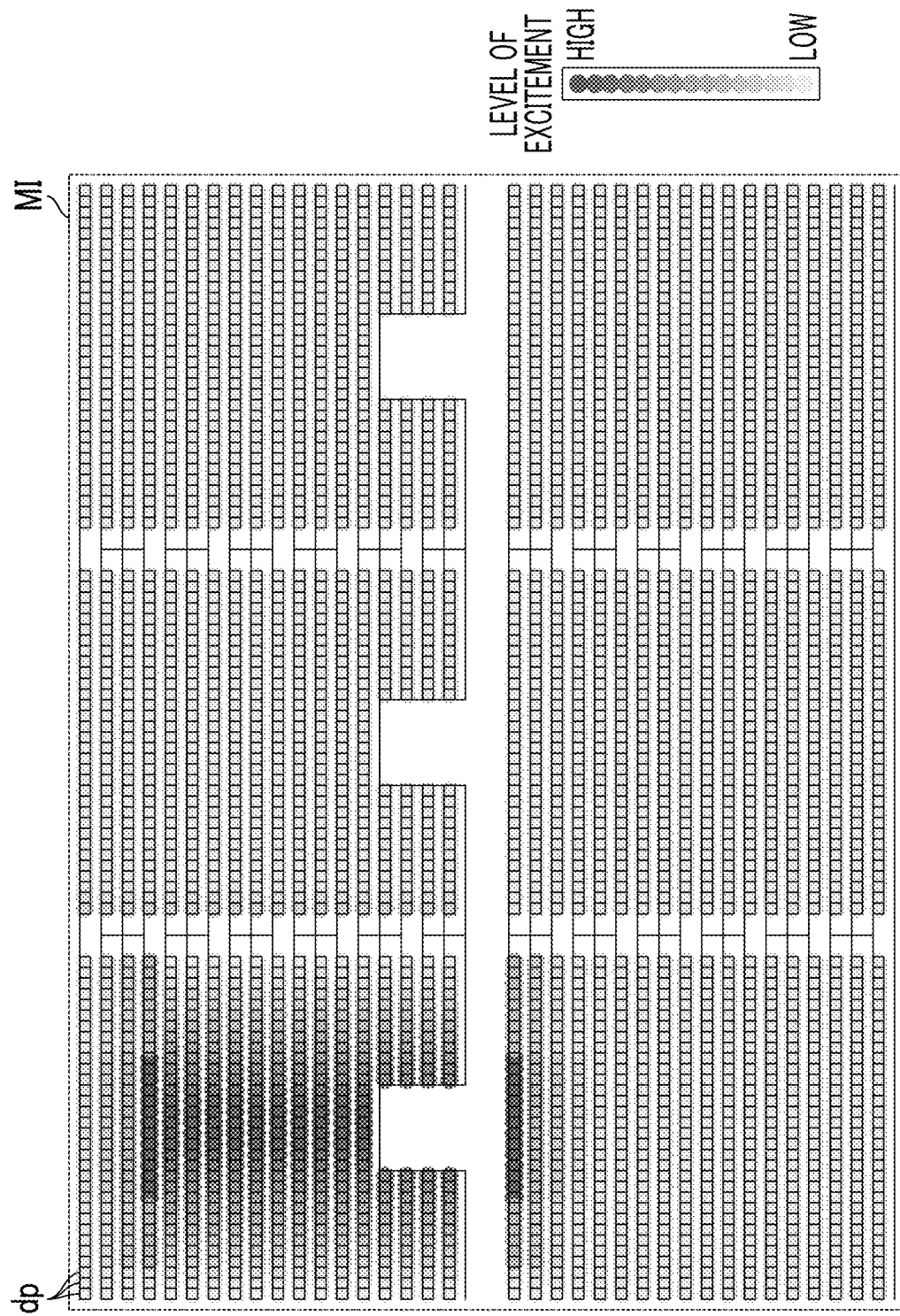
FIG. 10 is a diagram showing an example of visualized map data.

FIG. 10 is a diagram showing an example of visualized map data. FIG. 10 is a diagram showing a part of visualized map data (the image of the map).

Figure 11:
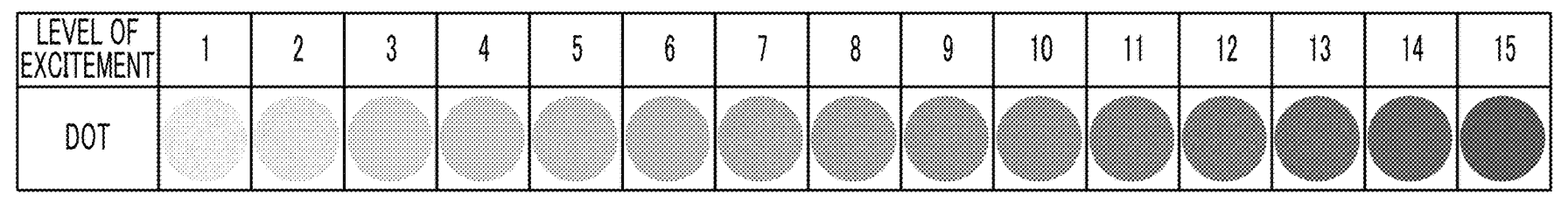

In the example shown in FIG. 10, the positions of spectators are shown in the image MI of the map by dots (circular dots) dp. The positions of the dots dp correspond to the positions of spectators in the taken image. The positions of spectators substantially coincide with the positions of the seats. Further, the dot dp showing the position of a spectator is displayed at a density corresponding to the level of excitement of the spectator. FIG. 11 is a diagram showing a relationship between the level of excitement and the display density of dots. The dot dp is displayed at a higher density as the numerical value of the level of excitement is larger. Accordingly, a spectator, which is displayed by a dot dp having a higher density, is a spectator having a higher level of excitement. It can be seen from the example shown in FIG. 10 that spectators having higher levels of excitement are concentrated on a block positioned on a diagonally upper left side in FIG. 10.

The dangerous area estimation unit 118 estimates a dangerous area, which is present in the venue, on the basis of the map data created by the map data creation unit 116. The dangerous area is an area that is estimated to be dangerous in the spectator area 320. In this embodiment, an area in which the number of spectators having a high level of excitement is equal to or larger than a predetermined number is regarded as the dangerous area. The dangerous area is an example of a first area. Further, the dangerous area estimation unit 118 is an example of a first area estimation unit.

For example, the dangerous area is estimated as follows. The spectator area 320 is divided into a plurality of partial areas. Spectators having a level of excitement equal to or higher than a first threshold value are counted in each divided partial area. After spectators having a level of excitement equal to or higher than the first threshold value are counted in all the partial areas, a partial area in which the number of spectators having a level of excitement equal to or higher than the first threshold value is equal to or larger than a second threshold value is extracted. The extracted partial area is estimated as the dangerous area.

Figure 12:
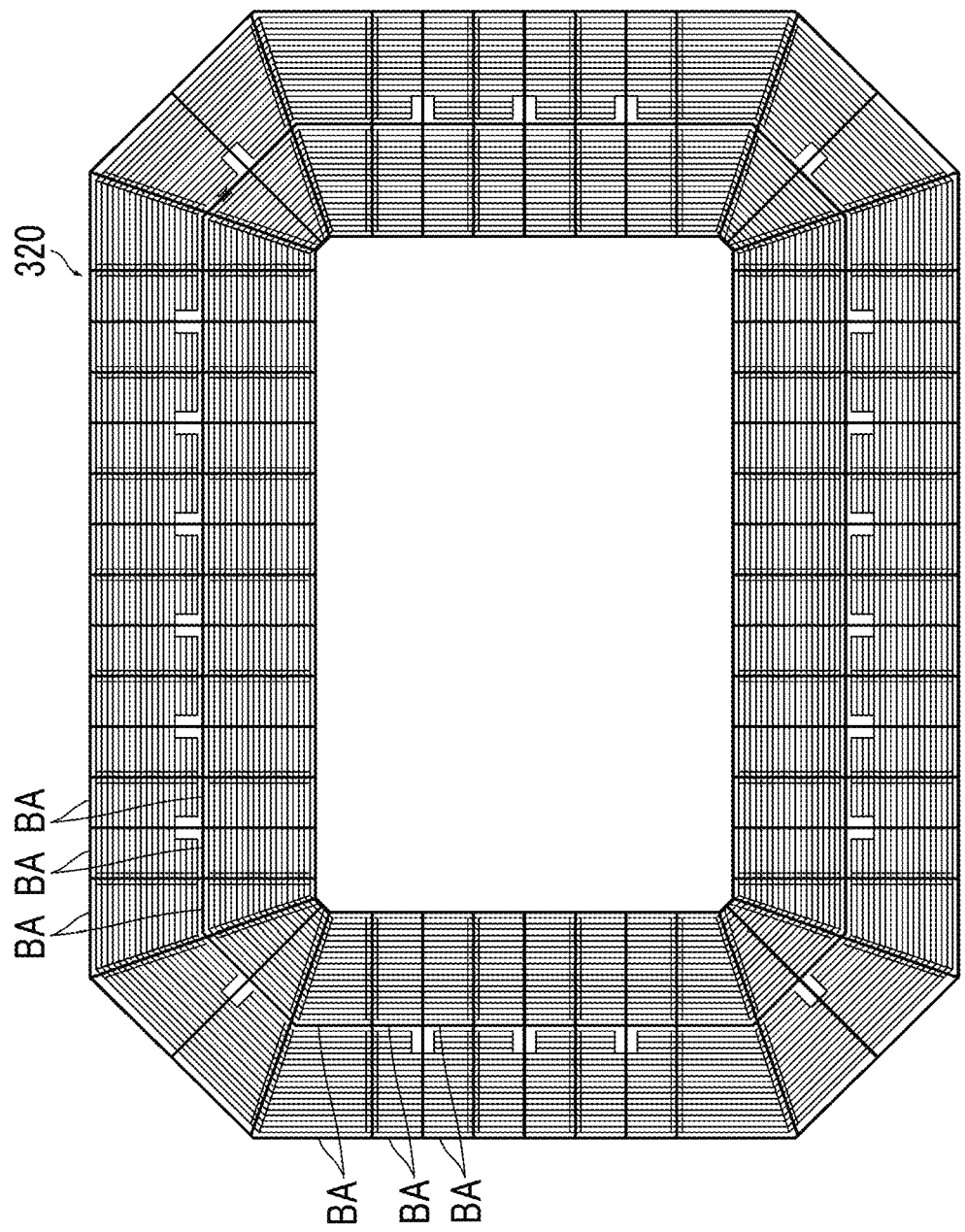
FIG. 12 is a diagram showing an example of the division of a spectator area.

FIG. 12 is a diagram showing an example of the division of the spectator area. Substantially all the blocks including seats are bisected in the circumferential direction (the lateral direction of the seat) in the example shown in FIG. 12, so that the spectator area 320 is divided into a plurality of partial areas BA.

Figure 13:
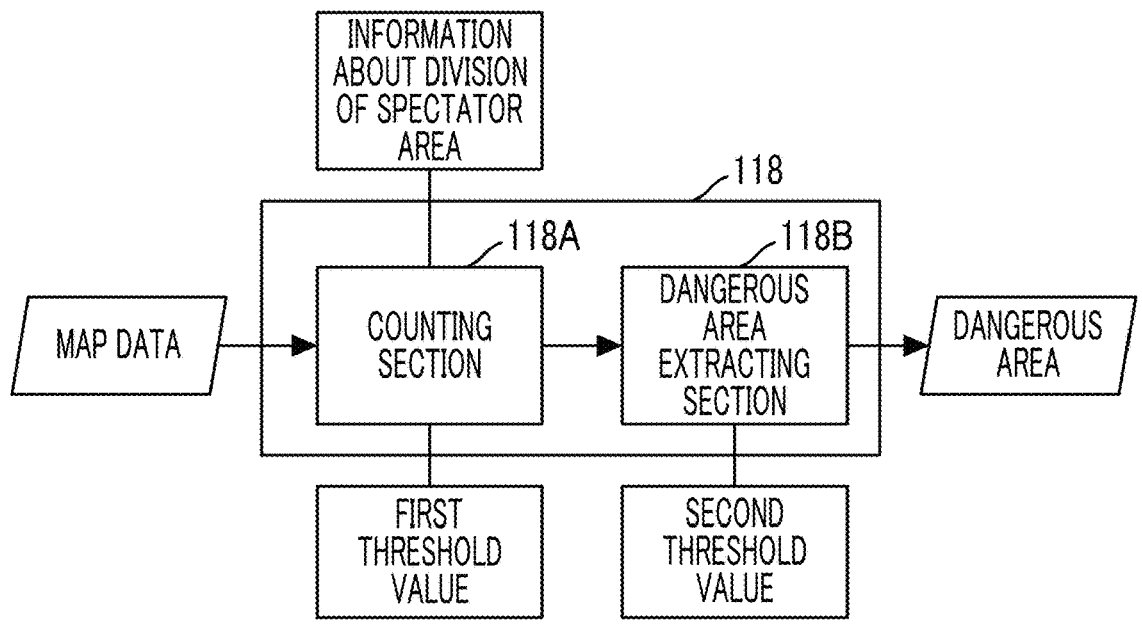
FIG. 13 is a block diagram showing the functions of a dangerous area estimation unit.

FIG. 13 is a block diagram showing the functions of the dangerous area estimation unit.

As shown in FIG. 13, the dangerous area estimation unit 118 includes a counting section 118A that counts persons (spectators) having a level of excitement equal to or higher than the first threshold value in each partial area, and a dangerous area extracting section 118B that extracts a partial area in which the number of persons (spectators) having a level of excitement equal to or higher than the first threshold value is equal to or larger than the second threshold value as the dangerous area.

The counting section 118A counts persons (spectators) having a level of excitement equal to or higher than the first threshold value in each partial area on the basis of information about the division of the spectator area 320. The information about the division is information that shows how to divide the spectator area 320. The information about the division of the spectator area 320 and the first threshold value are stored in, for example, the ROM 103 and the HDD 104.

Figure 14:
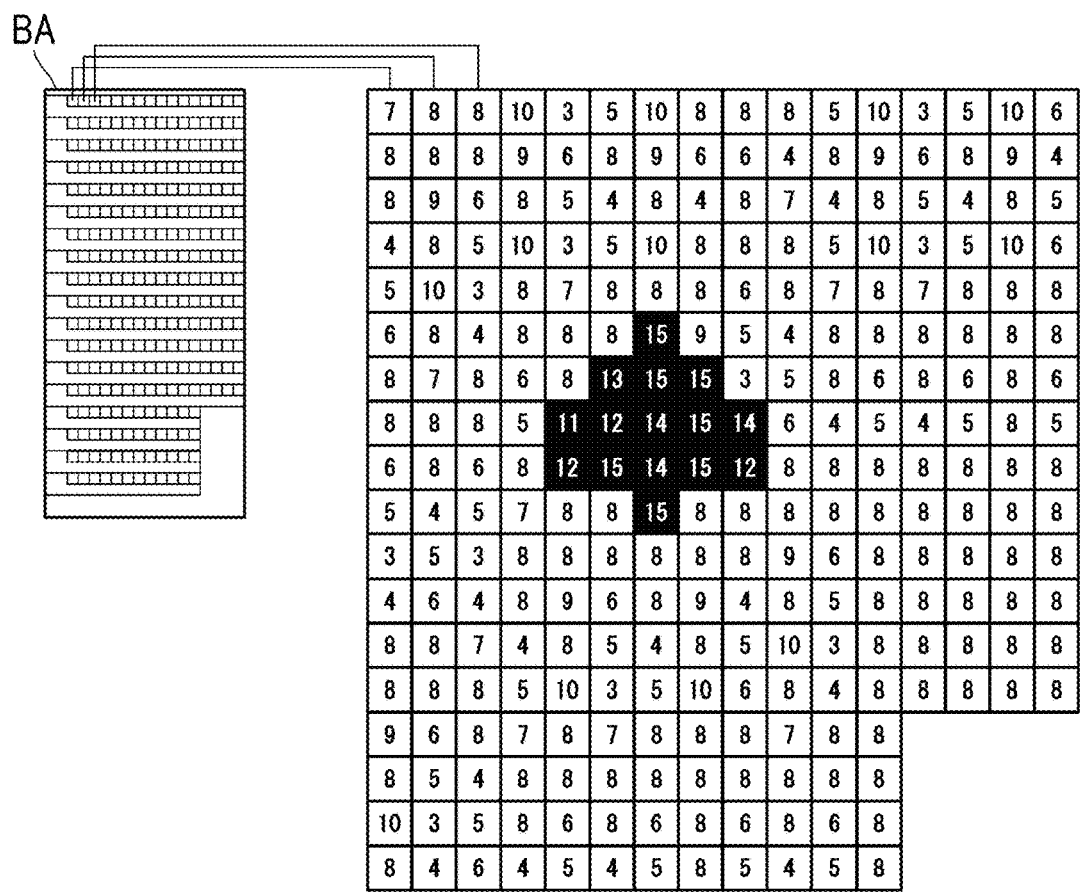
FIG. 14 is a diagram showing an example of the levels of excitement of the respective spectators in a certain partial area.

FIG. 14 is a diagram showing an example of the levels of excitement of the respective spectators in a certain partial area. In this example, the first threshold value is 11. In this case, spectators having a level of excitement equal to higher than 11 are counted. In the example shown in FIG. 14, the number of spectators having been counted is 15.

The dangerous area extracting section 118B extracts a partial area in which the number of persons (spectators) having a level of excitement equal to or higher than the first threshold value is equal to or larger than the second threshold value on the basis of the results of counting performed by the counting section 118A. The dangerous area extracting section 118B is an example of an extracting section. The second threshold value can also be set to a value that is common to the respective partial areas or can also be determined depending on each partial area. For example, in a case where the number of member (the number of seats in a case where there are the seats) of each partial area varies, the second threshold value can be set for each partial area. In this case, for example, a predetermined number of members corresponding to a predetermined ratio with respect to the number of members can be set as the second threshold value. The second threshold value is stored in, for example, the ROM 103 and the HDD 104.

Figure 15:
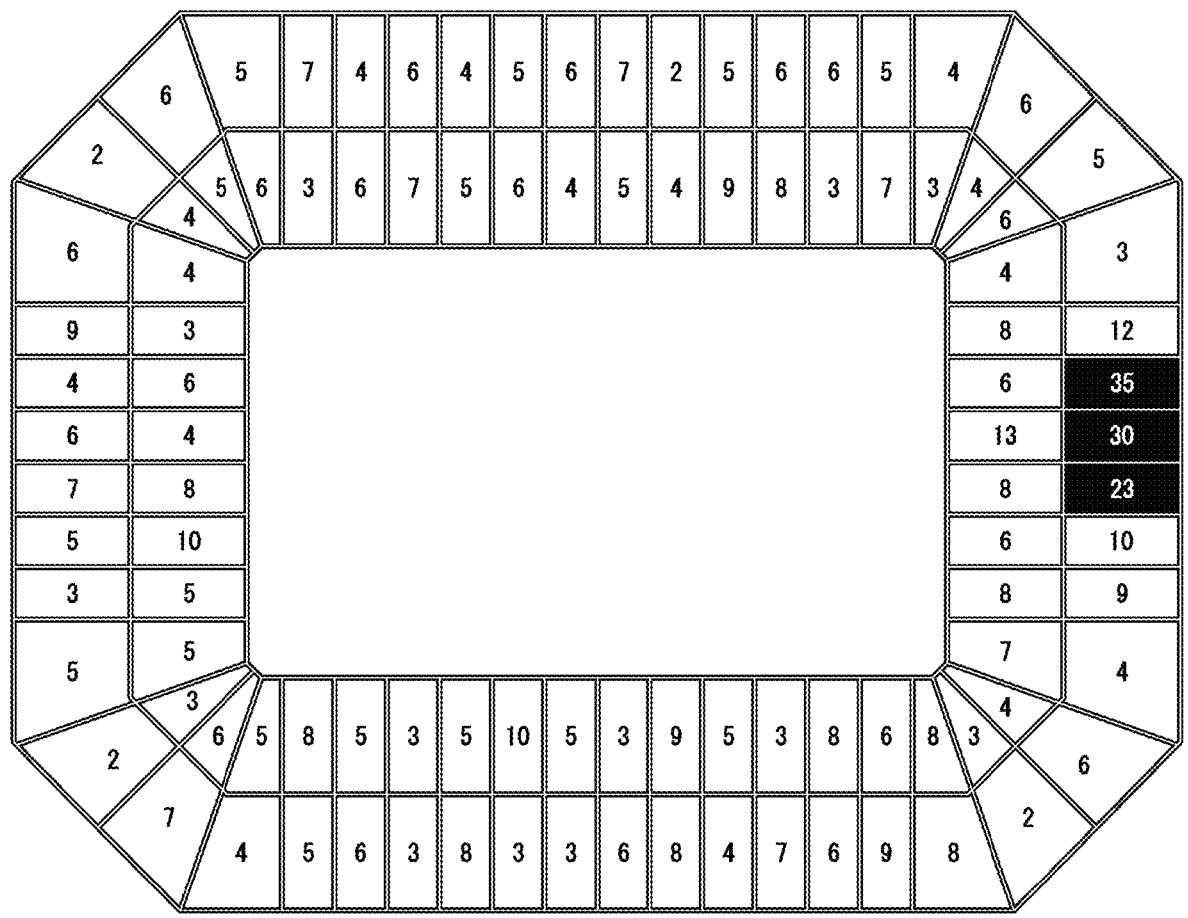
FIG. 15 is a diagram showing an example of the results of counting performed by a counting section.

FIG. 15 is a diagram showing an example of the results of counting performed by the counting section. In FIG. 15, a numerical value in each partial area is the number of persons (spectators) having a level of excitement equal to or higher than the first threshold value in each partial area. In each partial area, the second threshold value is uniformly set to 20. In the example shown in FIG. 15, three partial areas in which white numerals are shown are extracted as a dangerous area.

The movement route setting unit 120 sets movement routes for spectators on the basis of information about the dangerous area estimated by the dangerous area estimation unit 118. In the information processing apparatus 100 according to this embodiment, routes, which allow spectators present in the spectator area 320 to be guided to the outer peripheral area 330, are set as movement routes. The movement route setting unit 120 sets movement routes separately for the spectators present in the dangerous area and the spectators present in the area (non-dangerous area) other than the dangerous area. The non-dangerous area is the area of the spectator area 320 except for the dangerous area. The non-dangerous area is an example of a second area.

As described above, the spectators come and go between the spectator area 320 and the outer peripheral area 330 through the connecting passages 332. Accordingly, the movement route setting unit 120 sets routes (movement routes) that allow the spectators present in the dangerous area and the non-dangerous area to be guided to the connecting passages 332. In a case where routes are to be set, the movement route setting unit 120 sets the routes so that routes for the spectators present in the dangerous area and routes for the spectators present in the non-dangerous area do not intersect. In this embodiment, as described below, the movement route setting unit 120 sets routes in each area so that routes for the spectators present in the dangerous area and routes for the spectators present in the non-dangerous area do not intersect.

First, a method of setting movement routes in a case where there is no dangerous area in the spectator area 320 will be described.

Figure 16:
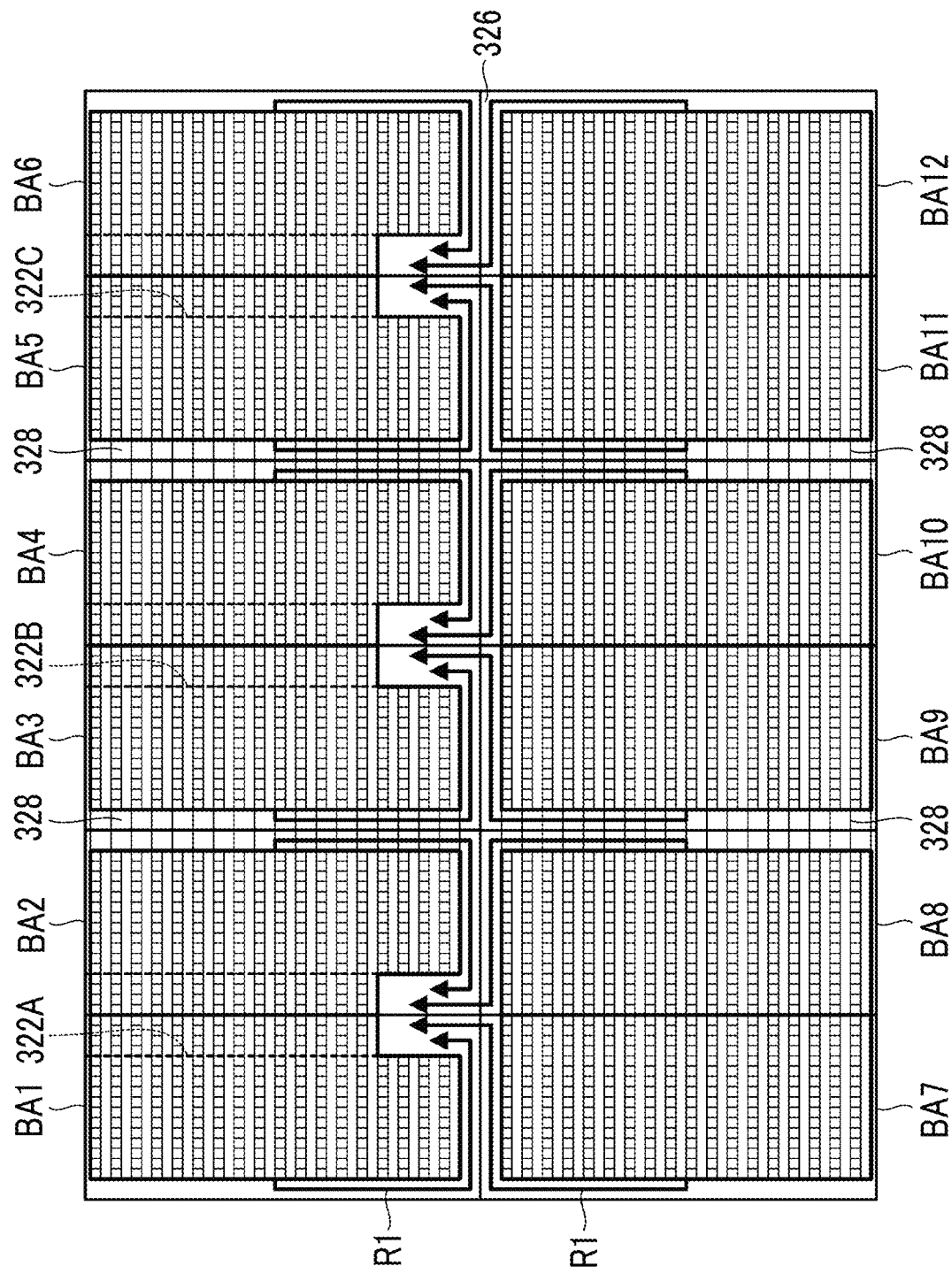
FIG. 16 is a diagram showing an example of the setting of movement routes in a case where there is no dangerous area in a spectator area.

FIG. 16 is a diagram showing an example of the setting of movement routes in a case where there is no dangerous area in the spectator area.

As shown in FIG. 16, a route R1 indicated by an arrow is a movement route that is set for each of the partial areas BA1 to BA12. In this case, the shortest route from each of the partial areas BA1 to BA12 to the closest connecting passage 332 is set as a movement route for each of the partial areas BA1 to BA12. For example, since a first connecting passage 332A is a connecting passage closest to the first partial area BA1 in FIG. 16, the shortest route to the first connecting passage 332A is set as the movement route.

Next, a method of setting movement routes in a case where there is a dangerous area in the spectator area 320 will be described.

Figure 17:
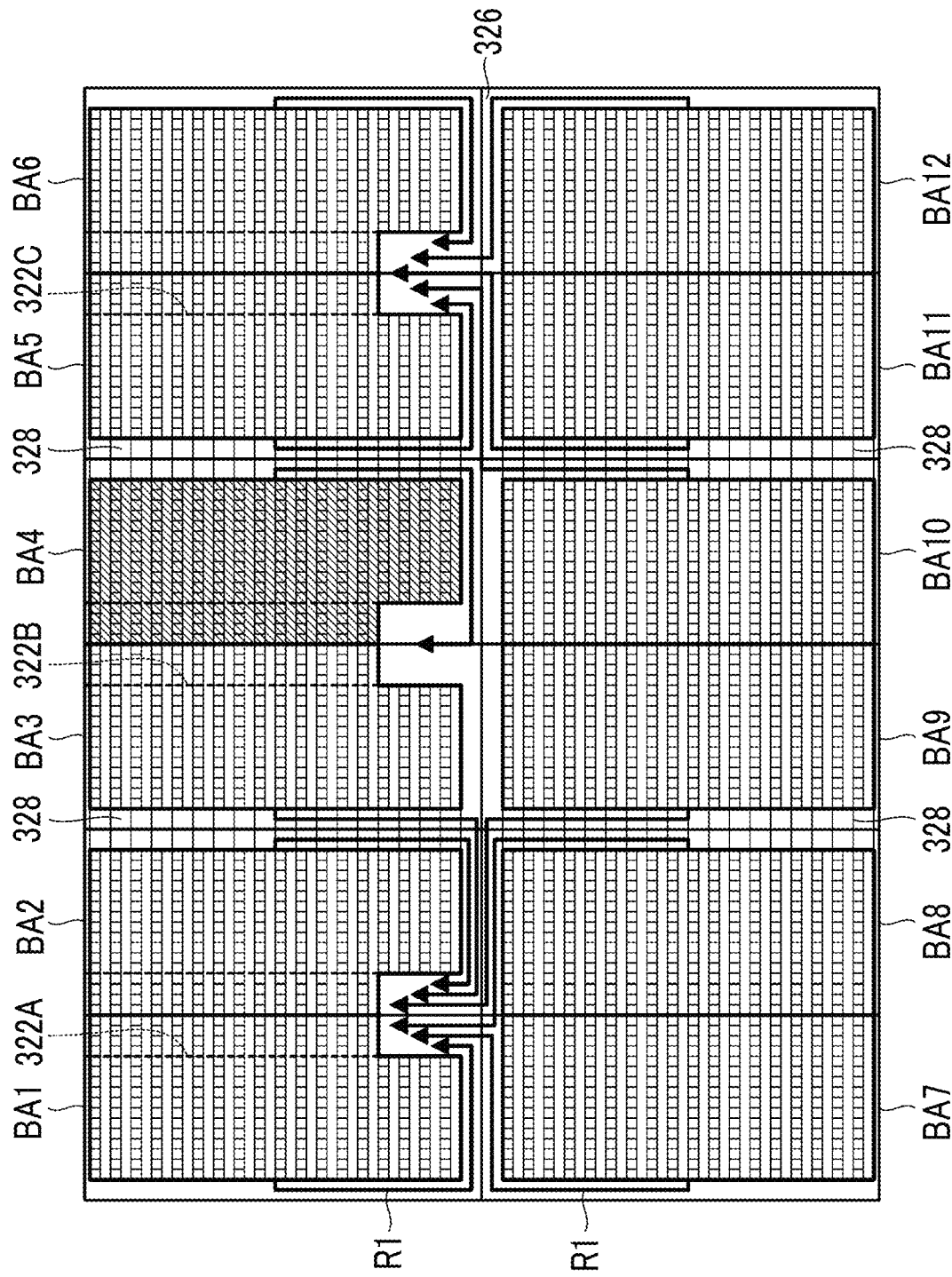
FIG. 17 is a diagram showing an example of the setting of movement routes in a case where there is a dangerous area in a spectator area.

FIG. 17 is a diagram showing an example of the setting of movement routes in a case where there is a dangerous area in a spectator area. FIG. 17 shows an example of a case where the fourth partial area BA4 is estimated as a dangerous area.

First, a connecting passage closest to each of the partial areas BA1 to BA12 is specified. The shortest route to the specified connecting passage is set (temporarily set) as a movement route for each of the partial areas BA1 to BA12. Then, partial areas, which are the partial areas (non-dangerous area) other than the dangerous area and in which the same connecting passage as the dangerous area is used, are extracted. In the example shown in FIG. 17, the third partial area BA3, the ninth partial area BA9, and the tenth partial area BA10 shown in FIG. 17 are partial areas in which the same connecting passage (a second connecting passage 332B) as the fourth partial area BA4 estimated as a dangerous area is used. After that, movement routes for the partial areas in which the same connecting passage as the dangerous area is used are reset. In this case, routes that allow spectators to be guided to the connecting passages different from the connecting passage for the dangerous area are set. Specifically, the next closest connecting passage is searched and the shortest route to the searched connecting passage is set as a movement route. For example, since the first connecting passage 332A is a connecting passage next closest to the third partial area BA3 in the example shown in FIG. 17, the shortest route to the first connecting passage 332A is set as a movement route for the third partial area BA3. Likewise, since the first connecting passage 332A is a connecting passage next closest to the ninth partial area BA9, the shortest route to the first connecting passage 332A is set as a movement route for the ninth partial area BA9. Further, since a third connecting passage 332C is a connecting passage next closest to the tenth partial area BA10, the shortest route to the third connecting passage 332C is set as a movement route for the tenth partial area BA10. Since the movement routes are set in this way, the movement routes for spectators present in the non-dangerous area can be set to avoid the dangerous area. That is, highly safe movement routes can be set for spectators present in the non-dangerous area.

A situation in which the next closest connecting passage may be the same connecting passage as spectators present in the dangerous area is also assumed. In this case, the shortest route to the next closest connecting passage is set as a movement route. However, in a case where the movement route is set in this way, a movement route allowing spectators to be guided to an extremely distant connecting passage may be set. In a case where an appropriate connecting passage (a connecting passage different from the connecting passage for spectators present in the dangerous area) cannot be found (searched) in a predetermined distance range (within a threshold value), the shortest route to the closest connecting passage is set as a movement route.

As shown in FIG. 6, the transmission unit 122 transmits information about a movement route to the guidance display devices 200 through the communication unit 108. As described later, the guidance display device 200 is provided in each partial area. Accordingly, the transmission unit 122 can also be configured to separately transmit only information about a movement route for a corresponding partial area to each guidance display device 200. Alternatively, the transmission unit 122 can also be configured to uniformly transmit information about movement routes for the entire spectator area to each guidance display device 200.

[Guidance Display Device]

As shown in FIG. 1, the guidance display devices 200 receive information about movement routes that is transmitted from the information processing apparatus 100, generate guidance information about routes on the basis of the received information about movement routes, and display the guidance information. The guidance display device 200 is an example of a presentation device. The guidance display devices 200 are installed at a plurality of positions in the venue.

Figure 18:
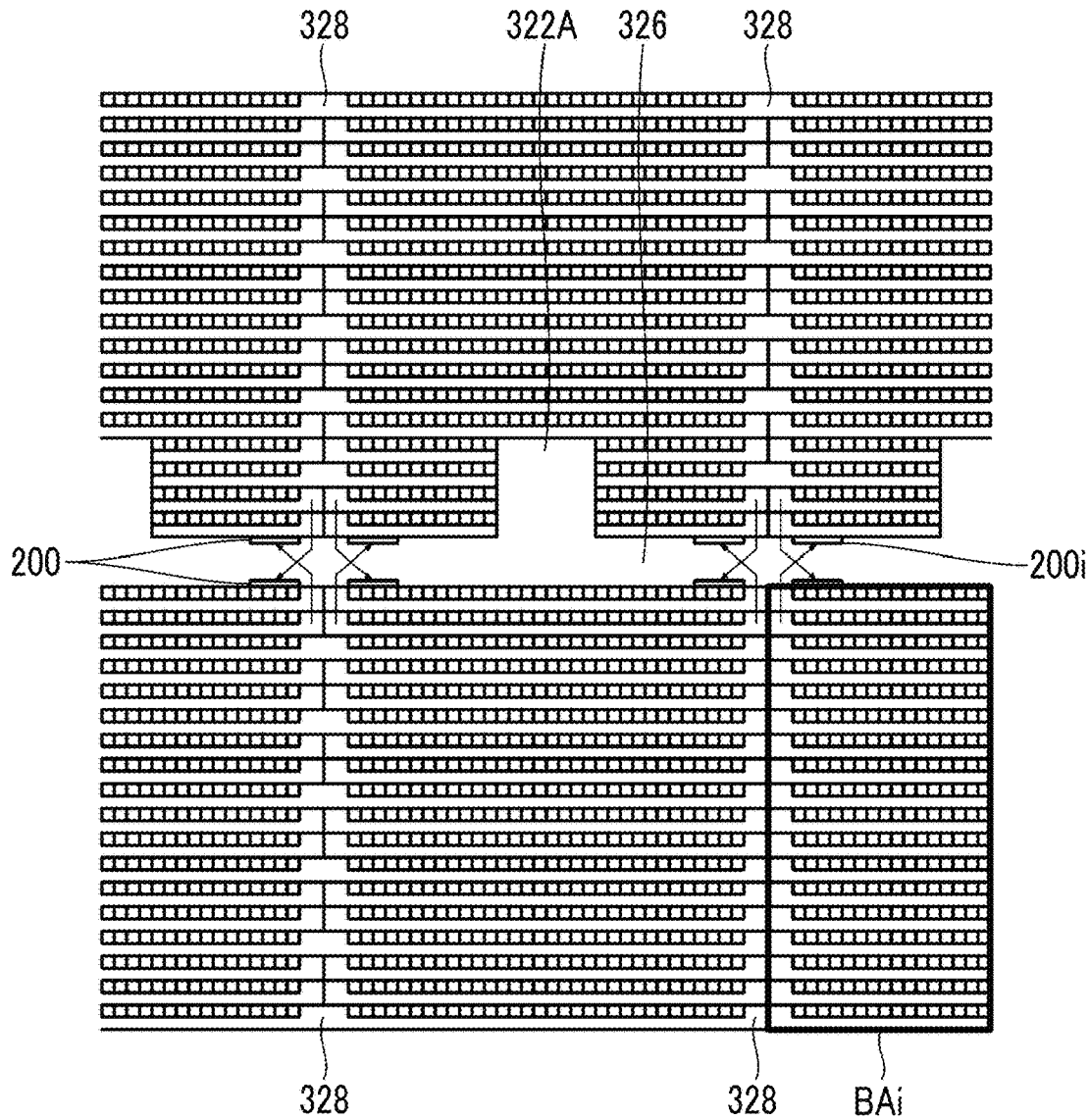
FIG. 18 is a diagram showing an example of the installation positions of guidance display devices.

FIG. 18 is a diagram showing an example of the installation positions of the guidance display devices.

As shown in FIG. 18, the guidance display devices 200 are installed at points where the annular passage 326 and the inter-block passages 328 intersect with each other in the guide system 1 according to this embodiment. The guidance display device 200 is provided in each partial area. In the example shown in FIG. 18, the guidance display devices 200 arranged on the opposite sides of the annular passage 326 are the guidance display devices 200 for the respective partial areas. For example, in FIG. 18, a guidance display device denoted by reference numeral 200i is a corresponding guidance display device for a partial area denoted by reference numeral BAi.

Figure 19:
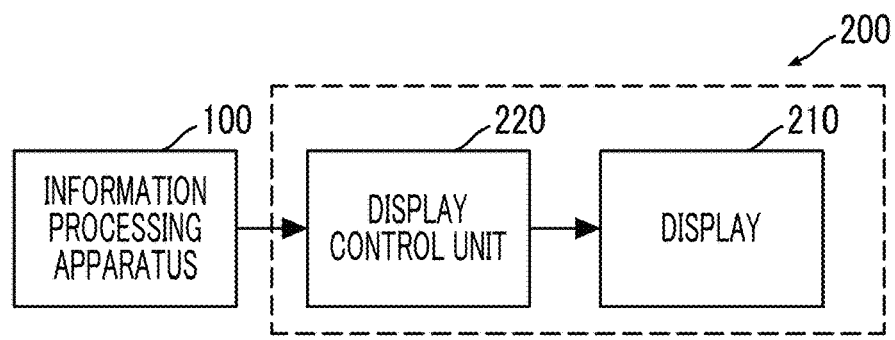
FIG. 19 is a block diagram showing the configuration of the guidance display device.

FIG. 19 is a block diagram showing the configuration of the guidance display device.

The guidance display device 200 comprises a display 210 and a display control unit 220 that controls the display of the display 210.

The display 210 is a display unit for guidance information. The display 210 is formed of, for example, an LCD, an OELD, or the like.

The display control unit 220 receives information about movement routes that is transmitted from the information processing apparatus 100. Further, the display control unit 220 generates guidance information on the basis of the received information about movement routes and causes the display 210 to display the guidance information. The display control unit 220 is formed of a computer that has a function of making a communication with the information processing apparatus 100.

Figure 20:
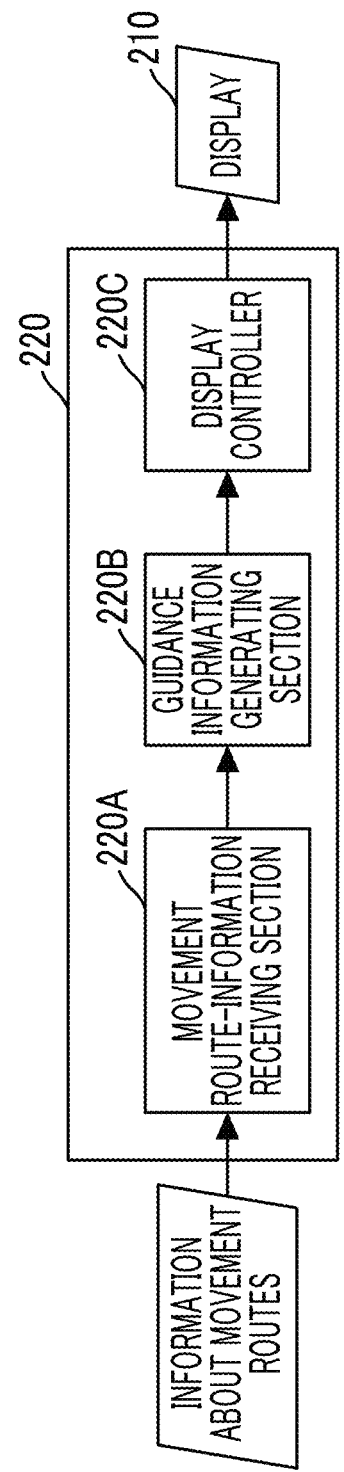
FIG. 20 is a block diagram showing the functions of a display control unit.

FIG. 20 is a block diagram showing the functions of the display control unit.

As shown in FIG. 20, the display control unit 220 has the functions of a movement route-information receiving section 220A, a guidance information generating section 220B, and a display controller 220C. A CPU of the computer executes a predetermined program, so that these functions are realized.

The movement route-information receiving section 220A receives information about movement routes that is transmitted from the information processing apparatus 100. The format of communication between the information processing apparatus 100 and the guidance display device 200 is not particularly limited.

The guidance information generating section 220B generates guidance information on the basis of the received information about movement routes. The guidance information generates guidance information for at least a corresponding partial area.

The display controller 220C causes the display 210 to display the generated guidance information.

Figure 21:
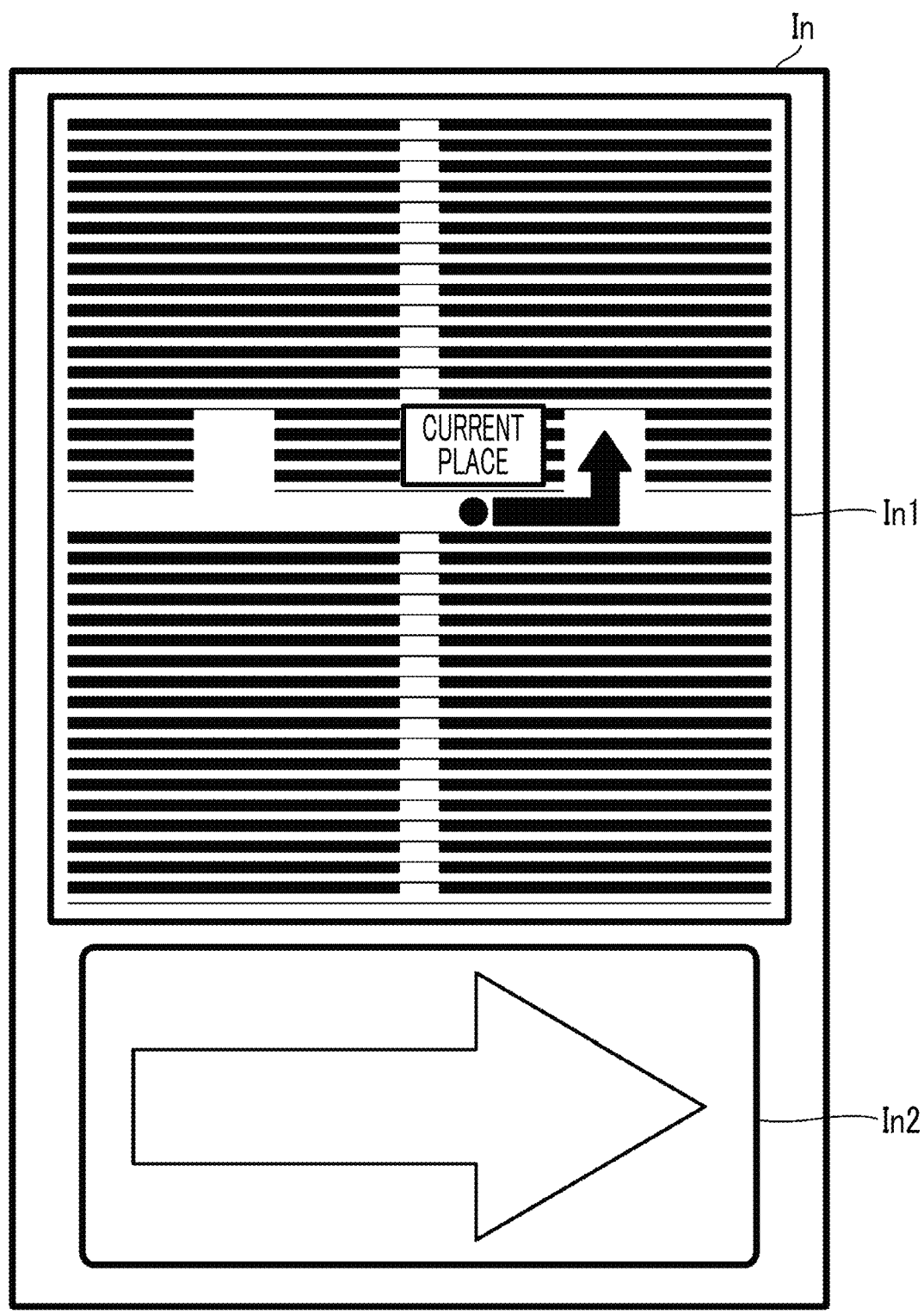
FIG. 21 is a diagram showing an example of guidance information that is displayed on a display.

FIG. 21 is a diagram showing an example of the guidance information that is displayed on the display.

In the example shown in FIG. 21, an image In in which a map In1 of the surrounding area of a current place (a point where the guidance display device 200 is installed) and an arrow In2 indicating a traveling direction are displayed is displayed as the guidance information. A set movement route is displayed by an arrow in the map In1 of the surrounding area.

[Operation of Guide System]

Figure 22:
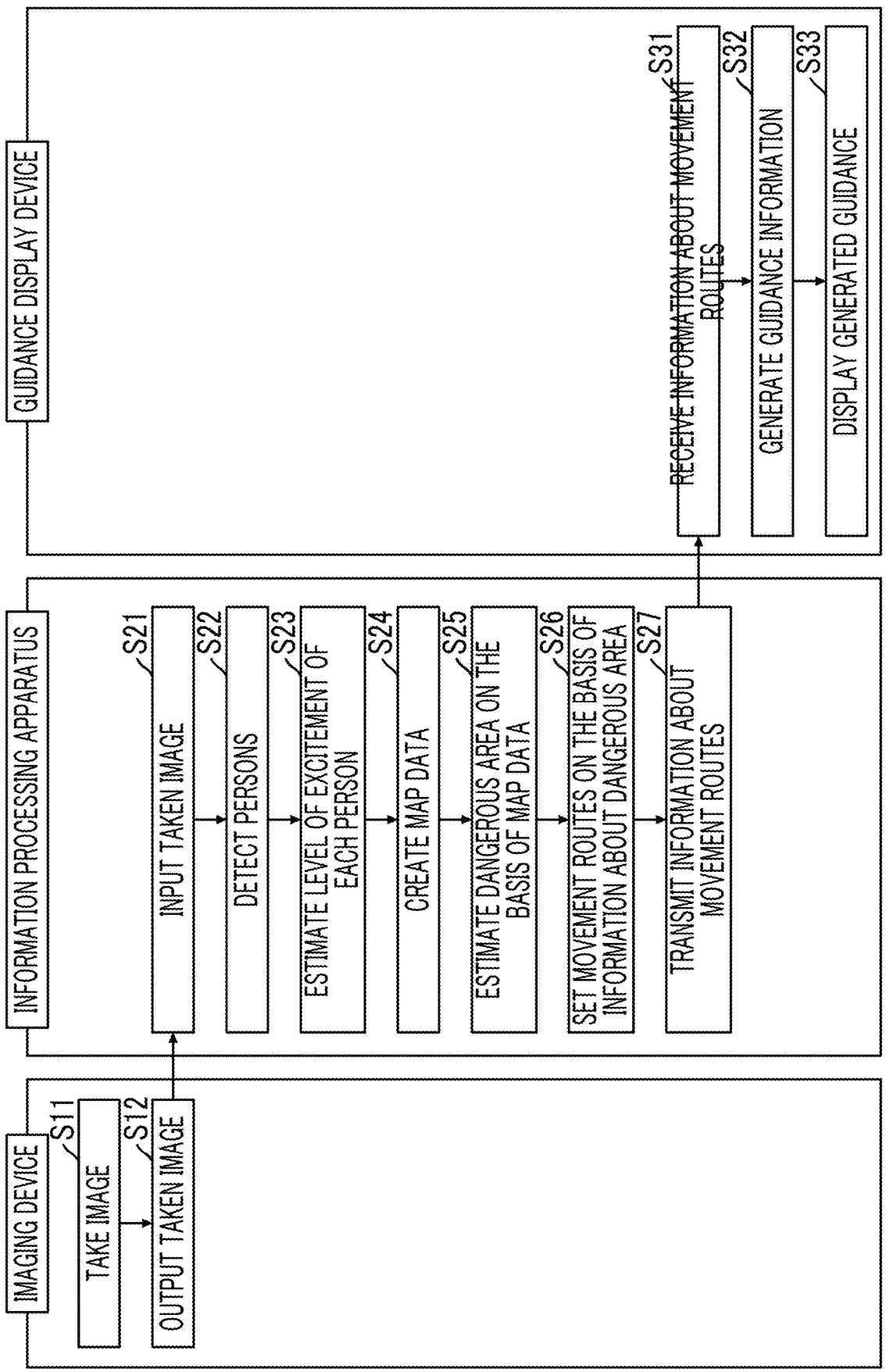
FIG. 22 is a flowchart showing the flow of processing of the guide system.

FIG. 22 is a flowchart showing the flow of processing of the guide system according to this embodiment.

[Processing Performed in Imaging Device]

First, an image is taken by the imaging device 10 installed in the event venue (Step S11). The image (taken image) taken by the imaging device 10 is output to the information processing apparatus 100 (Step S12). This image is the image of the spectator area.

[Processing Performed in Information Processing Apparatus]

The image (taken image), which is output from the imaging device 10, is input to the information processing apparatus 100 (Step S21). The information processing apparatus 100 sets movement routes for spectators on the basis of the input taken image (input image). The movement route is set according to the following procedure.

First, persons (spectators) present in the spectator area are detected from the taken image (Step S22). The positions of the persons in the image are specified, so that the persons are detected.

Next, the level of excitement of each detected person (the state of each person) is estimated (Step S23). The level of excitement is estimated from the image. Specifically, the expression of the face, the orientation of the face, and the movement of the body are recognized and the level of excitement is estimated from the image on the basis of the recognition results. The level of excitement is digitized and estimated.

After the levels of excitement of all the persons (spectators) are estimated (calculated), the map data of the levels of excitement are created (Step S24). The map data are data in which the level of excitement of each spectator is shown on the map of the venue according to the position of each spectator in the taken image.

After the map data are created, a dangerous area is estimated on the basis of the created map data (Step S25). The dangerous area is estimated according to the following procedure. First, spectators having a level of excitement equal to or higher than the first threshold value are counted for each partial area. The spectator area is divided into a plurality of areas, so that the partial areas are set. Next, a partial area in which the number of spectators having a level of excitement equal to or higher than the first threshold value is equal to or larger than the second threshold value is extracted as the dangerous area. The extracted partial area is regarded as the dangerous area.

In a case where processing for estimating the dangerous area is completed, movement routes for spectators are set on the basis of the estimation results of the processing (Step S26). The movement route is set for each partial area. Different routes are set as the movement routes depending on whether or not there is a dangerous area. In a case where there is no dangerous area in the spectator area, the shortest route to a connecting passage closest to each partial area is set as a movement route for each partial area. On the other hand, in a case where there is a dangerous area in the spectator area, movement routes for a non-dangerous area (partial areas other than the dangerous area) are set to avoid the dangerous area. Specifically, movement routes for a non-dangerous area will be set as follows. That is, a connecting passage closest to each of the partial areas BA1 to BA12 is specified first. The shortest route to the specified connecting passage is set (temporarily set) as a movement route for each of the partial areas BA1 to BA12. Then, partial areas (non-dangerous area) in which the same connecting passage as the dangerous area is used are extracted. After that, movement route for the partial areas, which are the partial areas (non-dangerous area) other than the dangerous area and in which the same connecting passage as the dangerous area is used, are changed (reset). That is, routes using connecting passages, which are different from the connecting passage used by spectators present in the dangerous area, are set. Specifically, the next closest connecting passage is searched and the shortest route to the searched connecting passage is set as a movement route. However, in a case where an appropriate connecting passage cannot be searched in a predetermined distance range, the shortest route to the closest connecting passage may be set as a movement route.

In a case where the setting of a movement route is completed for each of the partial areas (the dangerous area and the non-dangerous area), information about the set movement routes is transmitted to the guidance display devices 200 (Step S27).

Processing performed by the information processing apparatus 100, that is, processing for setting movement routes from the images may be configured to be continuously performed or may be configured to be performed at predetermined time intervals (may be configured to be performed at intervals). In a case where the processing is continuously performed, the imaging device 10 takes the images of the spectator area as a video. The information processing apparatus 100 processes the images, which are input as a video, by frame and sets movement routes. Even in a case where the processing is performed at predetermined time intervals, the information processing apparatus 100 can be configured so that a video is input to the information processing apparatus 100 and is processed. In this case, the information processing apparatus 100 processes the video at predetermined frame intervals and sets movement routes.

[Processing Performed in Guidance Display Device]

The guidance display devices 200 receive information about movement routes that is transmitted from the information processing apparatus 100 (Step S31). The guidance display devices 200 generate guidance information on the basis of the received information about movement routes (Step S32). The guidance display devices 200 cause the displays 210 to display the generated guidance information (Step S33).

The spectators move in the venue according to the guidance information displayed on the display 210 of the guidance display devices 200 during evacuation, leaving, or the like.

According to the guide system 1 of this embodiment, spectators present in the dangerous area and spectators present in the non-dangerous area can be guided separately as described above. Accordingly, it is possible to appropriately guide spectators depending on the situation of the venue. In particular, it is possible to guide spectators who are present in the non-dangerous area by highly safe routes. Further, since the reason why the routes are separated is kept secret, there is also no concern that resistance may occur in spectators present in the dangerous area.

Furthermore, since map data in which the state (the level of excitement) of each spectator is shown on a map according to the position of each spectator are created in the guide system 1 according to this embodiment, it is possible to accurately grasp the situation of the venue. Further, since the state of a spectator is digitized and displayed as the level of excitement, a dangerous area can be automatically extracted.

Second Embodiment

In a guide system according to this embodiment, an information processing apparatus records information about the level of excitement of each person (spectator) over time. Further, in a case where the information processing apparatus creates map data, the information processing apparatus creates the map data on the basis of the history of the level of excitement of each person.

Configuration other than the information processing apparatus is the same as that of the guide system according to the first embodiment. Accordingly, only the configuration of the information processing apparatus will be described below.

[Configuration of Information Processing Apparatus]

Figure 23:
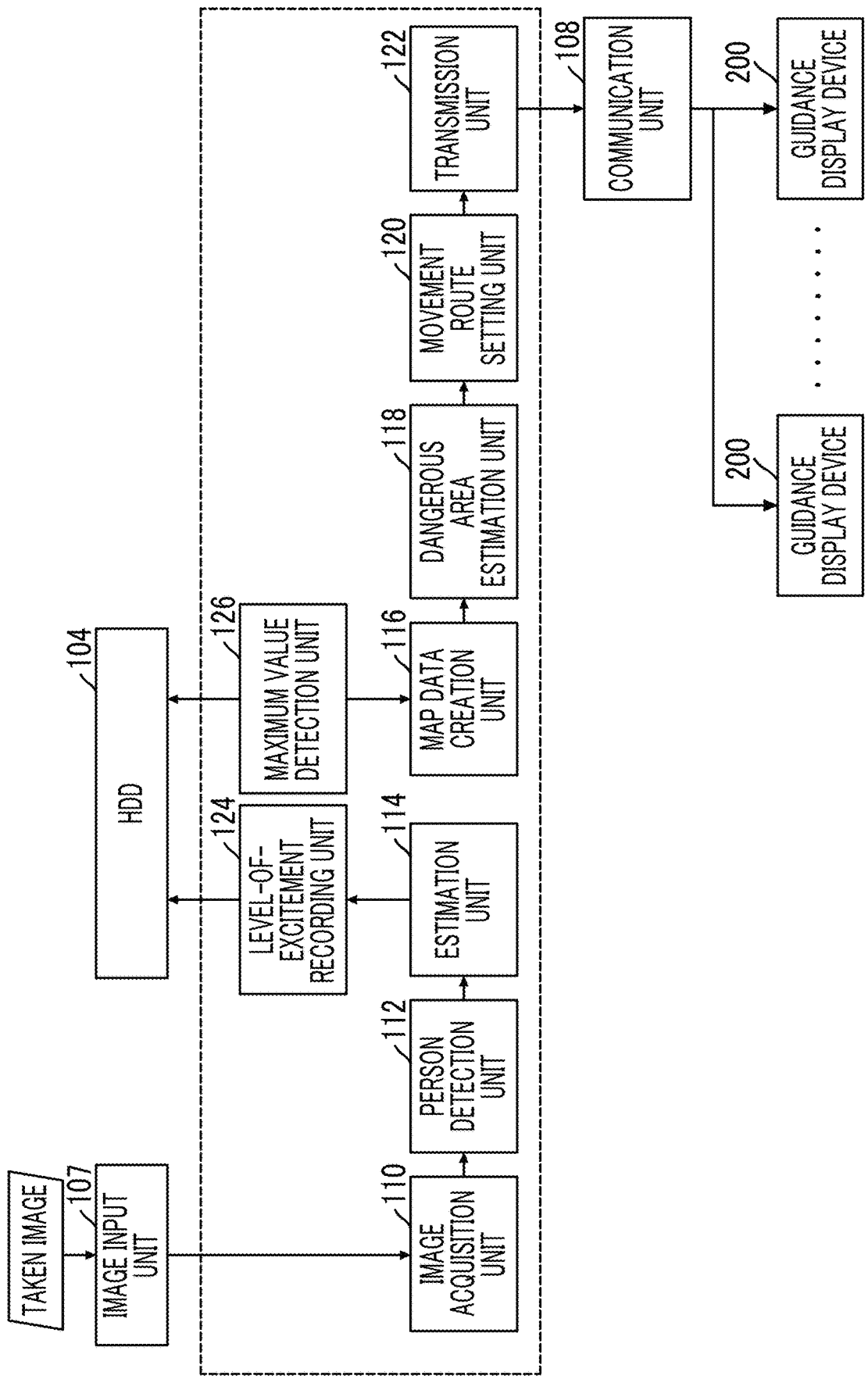
FIG. 23 is a block diagram showing functions that are realized by the information processing apparatus.

FIG. 23 is a block diagram showing functions that are realized by the information processing apparatus according to this embodiment.

As shown in FIG. 23, the information processing apparatus 100 according to this embodiment is different from the information processing apparatus according to the first embodiment in that the information processing apparatus 100 further includes a level-of-excitement recording unit 124 and a maximum value detection unit 126. Accordingly, only a difference between the information processing apparatus 100 and the information processing apparatus according to the first embodiment will be described below.

A CPU of a computer forming the information processing apparatus 100 executes a predetermined program, so that the functions of the level-of-excitement recording unit 124 and the maximum value detection unit 126 are realized.

The level-of-excitement recording unit 124 records the level of excitement of each spectator, which is estimated by the estimation unit 114, over time. In this embodiment, the level-of-excitement recording unit 124 records the level of excitement of each spectator in the HDD 104.

The maximum value detection unit 126 detects the maximum value (the maximum value in the history up to the time of detection) of the level of excitement of each spectator from the history of the level of excitement of each spectator that is recorded in the HDD 104 over time.

The map data creation unit 116 creates map data using the maximum value of the level of excitement that is detected by the maximum value detection unit 126.

[Operation of Information Processing Apparatus]

The information processing apparatus 100 according to this embodiment performs processing for setting movement routes at a predetermined time. Specifically, the predetermined time is a case where spectators are evacuated and guided, a case where spectators leave simultaneously, and the like.

Figure 24:
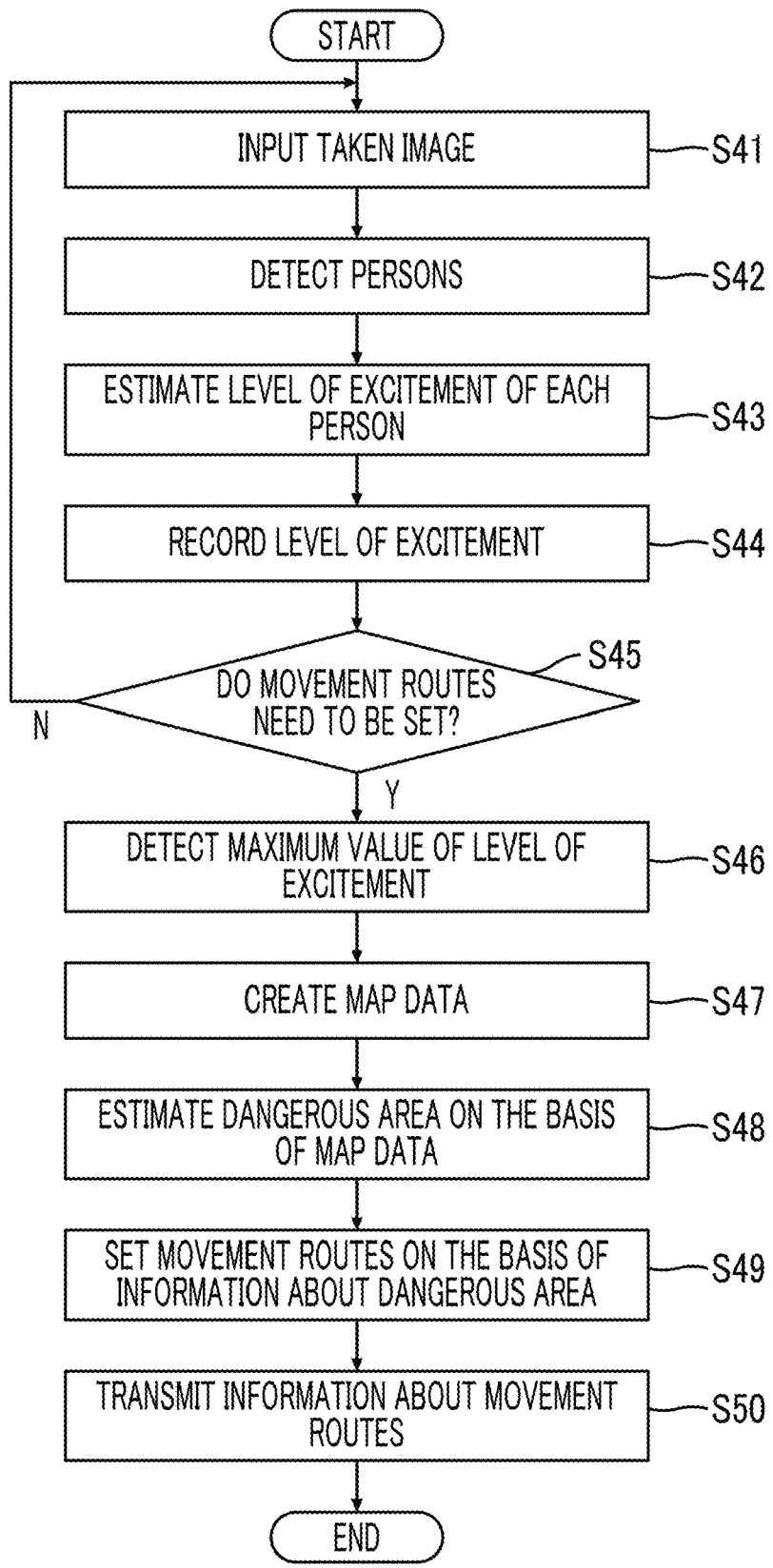
FIG. 24 is a flowchart showing the procedure of processing that is performed by the information processing apparatus.

FIG. 24 is a flowchart showing the procedure of processing that is performed by the information processing apparatus.

First, taken images are input (Step S41). The taken images to be input are a video (including still images continuously taken at regular time intervals). Then, persons (spectators) are detected from the input images (images of one frame) (Step S42). After that, the level of excitement of each of the detected persons (spectators) is estimated (Step S43). Next, the estimated level of excitement of each person (spectator) is recorded in the HDD 104 (Step S44). Then, whether or not movement routes need to be set is determined (Step S45). That is, whether or not it is time to set movement routes is determined. In a case where movement routes are not to be set, processing returns to Step S41 and images of the next frame are processed. On the other hand, in a case where movement routes are to be set, the maximum value of the level of excitement of each spectator is detected from the history of the level of excitement of each spectator recorded in the HDD 104 (Step S46). Then, map data are created using information about the detected maximum value of the level of excitement of each spectator (Step S47). After that, a dangerous area is estimated on the basis of the created map data (Step S48). Then, movement routes are set on the basis of information about the estimated dangerous area (Step S49). After that, information about the set movement routes is transmitted to the guidance display devices 200 (Step S50).

As described above, in the information processing apparatus 100 according to this embodiment, the history of the level of excitement of each spectator is recorded and map data are created on the basis of recorded history. Accordingly, a potential dangerous area can be extracted from the past history.

In this embodiment, the maximum value is obtained from the history to create map data. However, the use of the history is not limited thereto. In addition, for example, an average value of the level of excitement of each spectator may be obtained from the history of the level of excitement of each spectator and map data may be created using the obtained average value of the level of excitement. Further, the number of times the level of excitement of each spectator is equal to or higher than a threshold value may be obtained and map data may be created using the obtained number of times.

Modification Examples

[Modification Example of Method of Estimating State of Person]

In the embodiments, the state of a person has been specified using the degree of excitement. However, a method of specifying the state of a person is not limited thereto. For example, the state of a person can also be specified using the degree of a specific emotion (the degree of the emotion of anger, the degree of the emotion of joy, the degree of the emotion of fear, or the like).

Further, in a case where the state of a person is to be estimated, in the embodiments, the expression of the face, the orientation of the face, and the movement of the body of the person have been recognized and the state of the person has been estimated on the basis of the recognition results. However, the state of a person may be estimated using information about any one of them. For example, only the expression of the face of a person may be recognized and the state of the person may be estimated using only the recognition result of the expression. Alternatively, only the movement of the body of a person may be recognized and the state of the person may be estimated using only the recognition result of the movement of the body.

Further, in a case where an expression is to be recognized, plausible one has been specified from a plurality of predetermined types of expressions in the embodiments. However, a method of recognizing an expression is not limited thereto. For example, a method of recognizing an expression by classifying expressions into a plurality of types (for example, "joy", "anger", "disgust", "surprisal", "fear", "sadness", "sober face (absence of expression), and the like") and obtaining the degree (expression level) of each expression, and the like can be employed.

[Modification Example of Determination Criteria]

In the embodiments, scores have been given according to predetermined determination criteria in a case where the state (the level of excitement) of a person is to be estimated. The determination criteria themselves can also be relatively set. For example, determination criteria for the expression of a face may be determined from the cumulative total values of the respective expressions of the entire recognized face. Accordingly, determination criteria can be set actively depending on the type of an event or the like.

[Modification Example of Division of Spectator Area]

It is preferable that the division of the spectator area (division of the spectator area into partial areas) is appropriately set in consideration of the size of the venue, the arrangement of seats, the arrangement of passages in the venue, the number of doorways, and the like.

[Output of Map Data]

The map data may be capable of being visualized and output. In this case, the information processing apparatus further has the function of a visualization processing unit for map data. Visualized map data (so-called heat map, see FIG. 10) can be displayed by the display unit 106 of the information processing apparatus 100 or be displayed on another display device (another example of the display unit). Further, visualized map data can also be printed and output from a printer (an example of an output unit).

Like the map data, even information about movement routes can be displayed on the display unit 106 of the information processing apparatus 100 or be printed and output from a printer.

In a case where data obtained from visualization of the map data and information about movement routes are output in this way, it is possible to provide convenience in a case where persons (security guards or the like) guide spectators, and the like.

[Modification Example of Method of Setting Movement Routes]

A method of setting movement routes is not limited to the method described in the embodiment. For example, a method of setting a movement route for each partial area from information about a dangerous area by using a trained model generated by machine learning, deep learning, or the like can also be employed.

[Another Example of Method of Presenting Information about Movement Route]

In the embodiment, information about movement routes and guidance information based on the information about movement routes have been presented using the guidance display devices 200 installed in the venue. However, a method of presenting information about movement routes and the like is not limited thereto.

Figure 25:
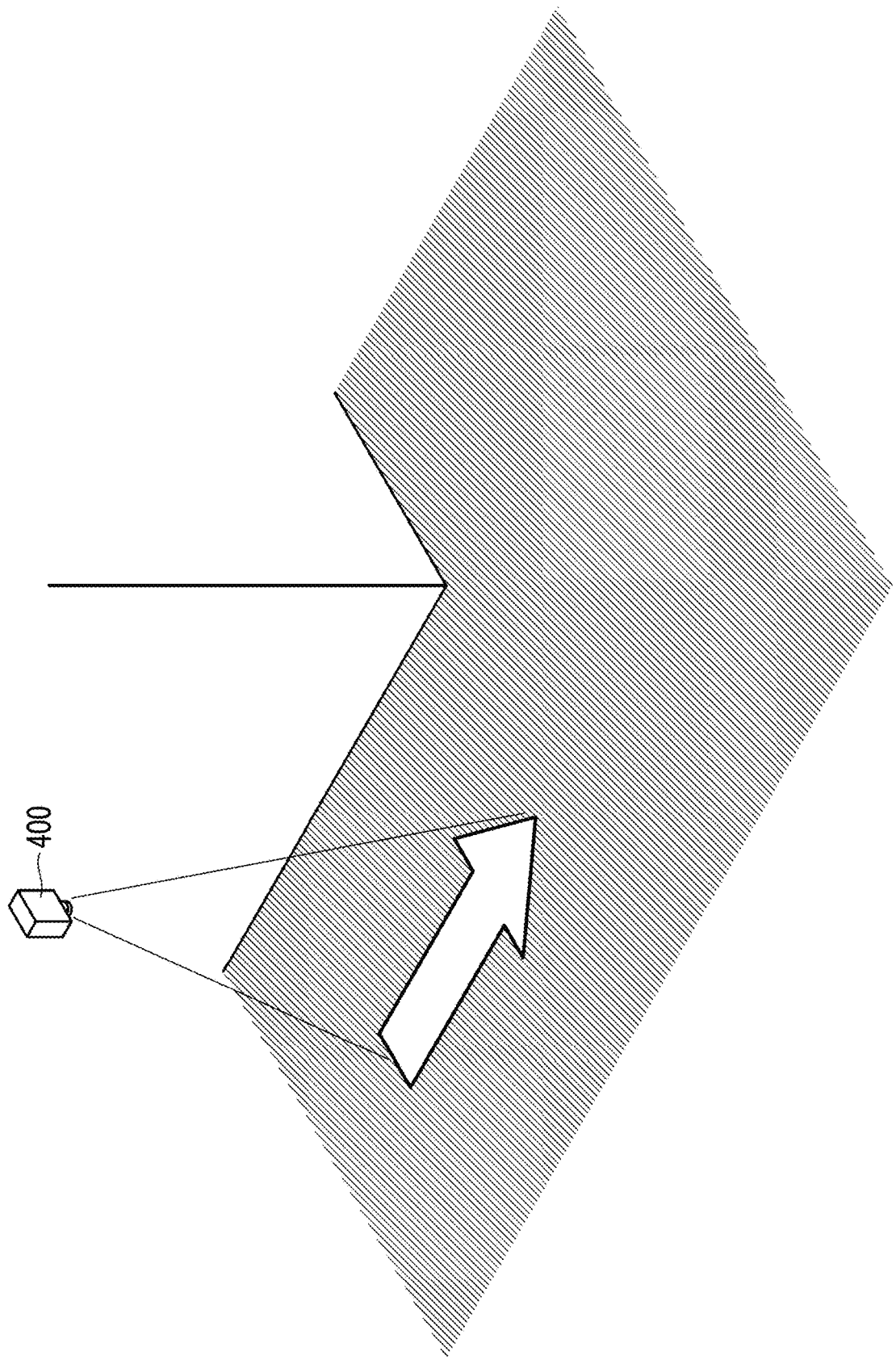
FIG. 25 is a diagram showing another example of a method of presenting guidance information.

FIG. 25 is a diagram showing another example of a method of presenting guidance information. In the example shown in FIG. 25, a projector 400 is used to present guidance information to spectators. The projector 400 projects an arrow, which indicates a traveling direction, on a passage to present guidance information.

Figure 26:
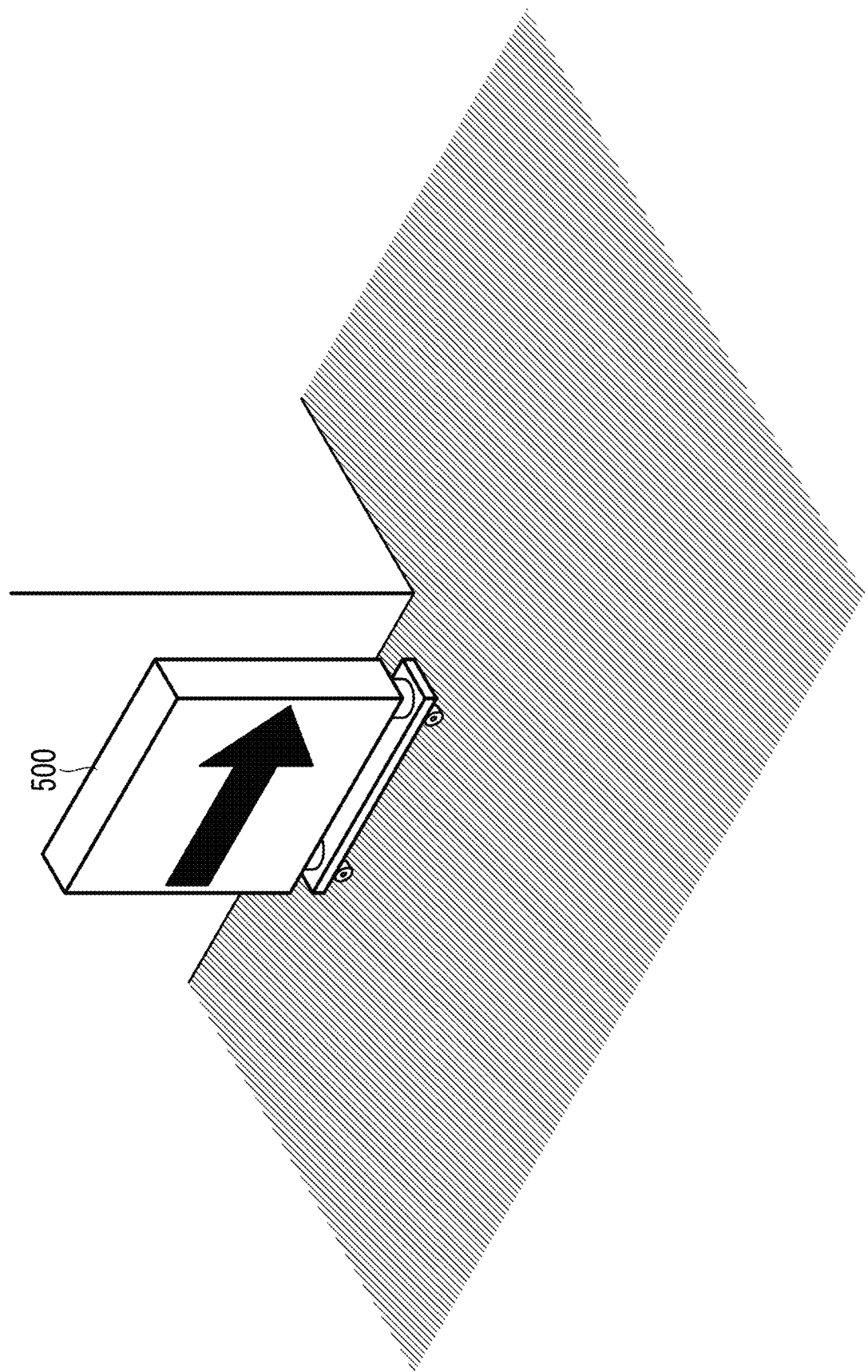
FIG. 26 is a diagram showing another example of a method of presenting guidance information.

FIG. 26 is a diagram showing another example of a method of presenting guidance information. FIG. 26 shows an example in which guidance information is presented by physical display. In the example shown in FIG. 26, a movable signboard 500 is used to present guidance information. The signboard 500 shown in FIG. 26 is a movable signboard comprising casters, and displays an arrow, which indicates a traveling direction, to present guidance information.

In a case where these methods are used, it is possible to present information about movement routes without providing special devices (mobile terminals or the like) to spectators.

Special devices (for example, mobile terminals, such as a smartphone and a tablet terminal, wearable computers, such as smart glasses and a smartwatch, personal computers, and the like) can also be provided to spectators to present information, such as movement routes. For example, information about movement routes can be transmitted to mobile terminals, wearable computers, and the like of spectators and can be presented on the screens or the like of the mobile terminals, wearable computers, and the like as characters or images. In this case, information about the positions of the respective spectators (for example, information about the positions of seats) is managed and information about movement routes corresponding to the positions of the respective spectators is transmitted. That is, information about movement routes for partial areas in which spectators are present is transmitted. Information about the positions of spectators is managed in association with information about the mobile terminals of the spectators. This association is made, for example, at the time of purchase of a ticket. Alternatively, this association is made in a case where each spectator registers information about one's own mobile terminal (telephone number, e-mail address, or the like) ex-post facto. Management is performed, for example, on a server. The server receives information about movement routes from the information processing apparatus, generates guidance information and the like, and transmits the guidance information and the like to the mobile terminals of the respective spectators.

[Modification Example of Configuration of Information Processing Apparatus]

Some or all the functions of the information processing apparatus can be realized by various processors. The various processors include: a central processing unit (CPU) that is a general-purpose processor functioning as various processing units by executing programs; a programmable logic device (PLD) that is a processor of which circuit configuration can be changed after manufacture, such as a field programmable gate array (FPGA); a dedicated electrical circuit that is a processor having circuit configuration designed exclusively to perform specific processing, such as an application specific integrated circuit (ASIC); and the like. The program is synonymous with software.

One processing unit may be formed of one of these various processors, or may be formed of two or more same type or different types of processors. For example, one processing unit may be formed of a plurality of FPGAs, or a combination of a CPU and an FPGA. Further, a plurality of processing units may be formed of one processor. As an example where a plurality of processing units are formed of one processor, first, there is an aspect in which one processor is formed of a combination of one or more CPUs and software and functions as a plurality of processing units. Second, there is an aspect where a processor implementing the functions of the entire system, which includes a plurality of processing units, by one integrated circuit (IC) chip is used as typified by System On Chip (SoC) or the like. In this way, various processing units are formed using one or more of the above-mentioned various processors as hardware structures.

EXPLANATION OF REFERENCES

1: guide system
10: imaging device
12: camera
100: information processing apparatus
101: CPU
103: ROM
104: HDD
105: operation unit
106: display unit
107: image input unit
108: communication unit
110: image acquisition unit
112: person detection unit
114: estimation unit
114A: expression recognizing section
114B: orientation recognizing section
114C: movement recognizing section
114D: scoring section
114E: level-of-excitement calculating section
116: map data creation unit
118: dangerous area estimation unit
118A: counting section
118B: dangerous area extracting section
120: movement route setting unit
122: transmission unit
124: level-of-excitement recording unit
126: maximum value detection unit
200: guidance display device
210: display
220: display control unit
220A: movement route-information receiving section
220B: guidance information generating section
220C: display controller
300: event venue
310: ground
320: spectator area
322: first-floor seating area
324: second-floor seating area
326: passage (annular passage)
328: passage (inter-block passage)
328A: handrail
330: outer peripheral area
332: passage (connecting passage)
332A to 332C: connecting passage
332X: doorway of connecting passage
334A: gate
334B: gate
334C: gate
334D: gate
400: projector
500: signboard
BA: partial area
BA1 to BA12: partial area
IP: image of person
IS1: part of taken image
In: image of guidance information
In1: map of the surrounding area
In2: arrow indicating traveling direction
MI: image of map
R1: movement route
W: imaging range
dp: dot
S11 to S12: procedure of processing performed in imaging device
S21 to S27: procedure of processing performed in information processing apparatus
S31 to S33: procedure of processing performed in guidance display device
S41 to S50: procedure of processing performed in information processing apparatus

What is claimed is:

1. An information processing apparatus comprising:
a processor; and
a memory that is connected to the processor,
wherein the processor is configured to
detect persons from an input image,
estimate a level of excitement of each of the detected persons from the input image, create map data in which the level of excitement of each of the persons are shown on a map according to positions of the persons in the input image, set a first area on the basis of the level of excitement of each of the detected persons in the first area, set a second area on the basis of the level of excitement of each of the detected persons in the second area, wherein a first score derived based on the level of excitement of each of the detected persons in the first area is higher than a second score derived based on the level of excitement of each of the detected persons in the second area, and set a movement route for persons of the first area and a different movement route for persons of the second area.

2. The information processing apparatus according to claim 1, wherein the processor is configured to transmit information about the set movement route to the persons in the first area and the different movement route to the persons in the second area.

3. The information processing apparatus according to claim 1, wherein the processor is configured to estimate the level of excitement of each of the detected persons from the input image comprising:

estimate the level of excitement of each of the detected persons from the input image based on predetermined criteria comprising a facial expression of a person and a body movement of the person.

4. The information processing apparatus according to claim 3, wherein the processor is configured to, in the estimation, give scores comprising the first score and the second score according to the predetermined criteria and digitize the level of excitement of each of the persons.

5. The information processing apparatus according to claim 1, wherein the processor is configured to estimate the level of excitement of each of the detected persons from the input image by recognizing an expression of a face, an orientation of the face, and a movement of the body of each of the persons from each of the detected persons in the input image, and, give scores corresponding to the expression of the face, the orientation of the face, and the movement of the body of each of the persons.

6. The information processing apparatus according to claim 1, wherein the processor is configured to, in the estimation of the first area, divide the input image into a plurality of partial areas and to count the persons having a level of excitement equal to or higher than a first threshold value in each partial area, extract the partial area in which the number of the persons having a level of excitement equal to or higher than the first threshold value is equal to or larger than a second threshold value, and estimate the extracted partial area as the first area.

7. The information processing apparatus according to claim 1, wherein the processor is configured to record the estimated level of excitement of the detected persons from the input image over time, detect maximum values of the level of excitement of the persons recorded over time, and create the map data using the maximum values in the creation of the map data.

8. The information processing apparatus according to claim 1, wherein the input image is an image that is obtained from imaging of a venue including a seat area in which a plurality of seats are arranged, and the first area and the second area are set in the seat area.

9. The information processing apparatus according to claim 1, wherein the processor is configured to output data obtained from visualization of the map data or information about the movement routes.

10. The information processing apparatus according to claim 1, further comprising:

a display configured to display data obtained from visualization of the map data or information about the movement routes.

11. A guide system comprising:

an information processing apparatus comprising:

a memory, and a hardware processor connected to the memory and configured to:

detect persons from an input image, estimate a level of excitement of each of the detected persons from the input image, create map data in which the level of excitement of each of the persons are shown on a map according to positions of the persons in the input image, set a first area on the basis of the level of excitement of each of the detected persons in the first area, set a second area on the basis of the level of excitement of each of the detected persons in the second area, wherein a first score derived based on the level of excitement of each of the detected persons in the first area is higher than a second score derived based on the level of excitement of each of the detected persons in the second area, and set a movement route for persons of the first area and a different movement route for persons of the second area; and transmit information about the set movement route to the persons in the first area and the different movement route to persons in the second area, a camera that takes an image to be input to the information processing apparatus; and a presentation device that receives the information about movement routes comprising the movement route and the different movement route transmitted from the information processing apparatus and presents the received information about the movement routes and guidance information about routes based on the information about the movement routes.

12. An information processing method comprising:

detecting persons from an input image;

estimating a level of excitement of each of the detected persons from the input image;

creating map data in which the level of excitement of each of the persons are shown on a map according to positions of the persons in the input image;

setting a first area on the basis of the level of excitement of each of the detected persons in the first area;

setting a second area on the basis of the level of excitement of each of the detected persons in the second area, wherein a first score derived based on the level of excitement of each of the detected persons in the first area is higher than a second score derived based on the level of excitement of each of the detected persons in the second area, and setting a movement route for persons of the first area and a different movement route for persons of the second area.

13. The information processing method according to claim 12, further comprising:
transmitting information about the set movement route to the persons in the first area and the different movement route to the persons in the second area.

14. A guide method comprising:
taking an image;
detecting persons from the taken image;
estimating a level of excitement of each of the detected persons from the input image;
creating map data in which the level of excitement of each of the persons are shown on a map according to positions of the persons in the taken image;
setting a first area on the basis of the level of excitement of each of the detected persons in the first area;
setting a second area on the basis of the level of excitement of each of the detected persons in the second area, wherein a first score derived based on the level of excitement of each of the detected persons in the first area is higher than a second score derived based on the level of excitement of each of the detected persons in the second area, and
setting a movement route for persons of the first area and a different movement route for persons of the second area; and
receiving the transmitted information about movement routes comprising the movement route and the different movement route and presenting the received information about the movement routes and guidance information about routes based on the information about the movement routes.

15. An information processing apparatus comprising:
a processor; and
a memory that is connected to the processor,
wherein the processor is configured to:
detect persons from an input image,
estimate a level of excitement of each of the detected persons from the input image,
create map data in which the level of excitement of each of the persons are shown on a map according to positions of the persons in the input image,
set a first area on the basis of the level of excitement of each of the detected persons in the first area,
set a second area on the basis of the level of excitement of each of the detected persons in the second area, wherein a first score derived based on the level of excitement of each of the detected persons in the first area is higher than a second score derived based on the level of excitement of each of the detected persons in the second area, and
set a movement route for persons of the first area and a different movement route for persons of the second area other than the first area, wherein the processor is configured to estimate the level of excitement of each of the detected person in the input image by recognizing at least one of an expression of a face or a movement of a body of each of the detected persons from the input image;
and giving a score corresponding to the at least one of the expression of the face or the movement of the body of each of the detected persons from the input image.

16. The information processing apparatus according to claim 15,
wherein the score of the first area is determined by summing all scores of each of the detected persons from the input image in the first area and the score of the second area is determined by summing all score of each of the detected person in the second area from the input image.

17. The information processing apparatus according to claim 15,
wherein the processor is configured to, in the estimation of the first area, divide the input image into a plurality of partial areas and to count the persons having a level of excitement equal to or higher than a first threshold value in each partial area, extract the partial area in which the number of the persons having a level of excitement equal to or higher than the first threshold value is equal to or larger than a second threshold value, and estimate the extracted partial area as the first area.

18. The information processing apparatus according to claim 15,
wherein the processor is configured to record the estimated level of excitement of each of the detected persons from the input image over time, detect maximum values of the level of excitement of each of the persons recorded over time, and create the map data using the maximum values in the creation of the map data.

19. The information processing apparatus according to claim 15,
wherein the input image is obtained from imaging of a venue including a seat area in which a plurality of seats are arranged, and
the first area and the second area are set in the seat area.

20. The information processing apparatus according to claim 15,
wherein the processor is configured to output data obtained from visualization of the map data and information about the movement routes.

21. The information processing apparatus according to claim 15, further comprising:
a display configured to display data obtained from visualization of the map data and information about the movement routes.

* * * * *